United States Patent
Yamaguchi et al.

(10) Patent No.: US 11,524,487 B2
(45) Date of Patent: Dec. 13, 2022

(54) LAMINATED GLASS AND METHOD FOR FITTING LAMINATED GLASS

(71) Applicant: SEKISUI CHEMICAL CO., LTD., Osaka (JP)

(72) Inventors: Kouhei Yamaguchi, Kouka (JP); Masaki Yamamoto, Kouka (JP); Daisuke Nakajima, Kouka (JP); Izumi Matsumoto, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/111,396

(22) PCT Filed: Jan. 30, 2015

(86) PCT No.: PCT/JP2015/052774
§ 371 (c)(1),
(2) Date: Jul. 13, 2016

(87) PCT Pub. No.: WO2015/115627
PCT Pub. Date: Aug. 6, 2015

(65) Prior Publication Data
US 2016/0332425 A1    Nov. 17, 2016

(30) Foreign Application Priority Data

Jan. 31, 2014 (JP) ............... JP2014-016453
Jan. 31, 2014 (JP) ............... JP2014-016454

(51) Int. Cl.
  B32B 17/10     (2006.01)
  B32B 27/22     (2006.01)
  B32B 27/30     (2006.01)
  B32B 27/08     (2006.01)
  B32B 27/20     (2006.01)

(52) U.S. Cl.
CPC .. B32B 17/10165 (2013.01); B32B 17/10018 (2013.01); B32B 17/1022 (2013.01); B32B 17/10036 (2013.01); B32B 17/10614 (2013.01); B32B 17/10633 (2013.01); B32B 17/10678 (2013.01); B32B 17/10688 (2013.01); B32B 17/10761 (2013.01); B32B 27/08 (2013.01); B32B 27/20 (2013.01); B32B 27/22 (2013.01); B32B 27/306 (2013.01); B32B 2264/102 (2013.01); B32B 2307/304 (2013.01); B32B 2307/416 (2013.01)

(58) Field of Classification Search
CPC ........ B32B 17/10165; B32B 17/10651; B32B 17/10018; B32B 17/10201; B32B 17/10614; B32B 17/10761; B32B 17/10688; B32B 17/1022; B32B 17/10504; B32B 17/10633; B32B 17/10678; B32B 17/10036; B32B 27/08; B32B 27/20; B32B 27/22; B32B 27/306; B32B 2367/00; B32B 2250/05; B32B 2605/00; B32B 2307/304; B32B 2307/416; B32B 2419/00; B32B 2264/102

See application file for complete search history.

(56) References Cited

U.S. PATENT DOCUMENTS

| | | | |
|---|---|---|---|
| 5,244,503 | A | 9/1993 | Fabian |
| 6,598,358 | B1 | 7/2003 | Schwertfeger et al. |
| 6,673,456 | B1 | 1/2004 | Kobata et al. |
| 7,687,560 | B2 | 3/2010 | Rymer et al. |
| 10,442,163 | B2 | 10/2019 | Tsunoda et al. |
| 10,654,250 | B2 | 5/2020 | Ohmoto et al. |
| 2004/0234778 | A1 | 11/2004 | Fukatani et al. |
| 2005/0181220 | A1 | 8/2005 | Kobata |
| 2006/0008640 | A1 | 1/2006 | Chonan et al. |
| 2006/0050425 | A1 | 3/2006 | Muromachi et al. |

(Continued)

FOREIGN PATENT DOCUMENTS

| | | |
|---|---|---|
| CN | 102333739 A | 1/2012 |
| EP | 2 677 352 A1 | 12/2013 |

(Continued)

OTHER PUBLICATIONS

Written Opinion of the International Searching Authority (PCT/ISA/237) for Application No. PCT/JP2015/052774 dated Mar. 17, 2015 (English Translation mailed Aug. 11, 2016).
Written Opinion of the International Searching Authority (PCT/ISA/237) for Application No. PCT/JP2015/052773 dated Mar. 17, 2015 (English Translation mailed Aug. 11, 2016).
Restriction Requirement for the U.S. Appl. No. 15/111,330 from the United States Patent and Trademark Office dated Jan. 12, 2018.
HyperPhysics Website; http://byperphysics.phy-astr.gsu.edu/base/ems3.htmi.

(Continued)

*Primary Examiner* — Cheng Yuan Huang
(74) *Attorney, Agent, or Firm* — Cheng Law Group, PLLC

(57) ABSTRACT

There is provided laminated glass which is high in heat shielding properties. The laminated glass according to the present invention includes a first laminated glass member, a second laminated glass member and an interlayer film arranged between the first and second laminated glass members, the interlayer film includes an infrared ray reflection layer which reflects infrared rays, a first resin layer which is arranged on a first surface side of the infrared ray reflection layer and contains a thermoplastic resin and a second resin layer which is arranged on a second surface side of the infrared ray reflection layer and contains a thermoplastic resin, and the infrared ray transmittance in the wavelength of 780 to 2100 nm of the whole layer composed of the first laminated glass member and the first resin layer is higher by 15% or more than the infrared ray transmittance in the wavelength of 780 to 2100 nm of the whole layer composed of the second laminated glass member and the second resin layer.

18 Claims, 1 Drawing Sheet

(56) References Cited

U.S. PATENT DOCUMENTS

| | | | |
|---|---|---|---|
| 2006/0110593 | A1 | 5/2006 | Fukatani et al. |
| 2006/0225614 | A1* | 10/2006 | Hagiwara .......... B32B 17/10174 106/287.19 |
| 2007/0134487 | A1 | 6/2007 | Marumoto |
| 2007/0231584 | A1 | 10/2007 | Hasegawa |
| 2011/0181820 | A1 | 7/2011 | Watanabe |
| 2011/0287265 | A1 | 11/2011 | Hasegawa |
| 2011/0300356 | A1 | 12/2011 | Takamatsu et al. |
| 2012/0162752 | A1 | 6/2012 | Kitano et al. |
| 2012/0164409 | A1* | 6/2012 | Masaki ............. B32B 17/10036 428/203 |
| 2012/0164457 | A1 | 6/2012 | Fukatani et al. |
| 2012/0171479 | A1 | 7/2012 | Fukatani et al. |
| 2012/0250146 | A1 | 10/2012 | Tamai et al. |
| 2013/0128342 | A1* | 5/2013 | Mitarai ............. B32B 17/10036 359/359 |
| 2013/0143049 | A1 | 6/2013 | Kitano et al. |
| 2013/0323517 | A1 | 12/2013 | Kitano et al. |
| 2013/0337247 | A1* | 12/2013 | Kitano .................... B32B 27/18 428/213 |
| 2015/0168619 | A1 | 6/2015 | Ohmoto et al. |
| 2015/0251385 | A1* | 9/2015 | Oota ....................... C08K 5/12 428/441 |
| 2017/0259533 | A1 | 9/2017 | Yamamoto et al. |

FOREIGN PATENT DOCUMENTS

| | | |
|---|---|---|
| EP | 2 883 847 A1 | 6/2015 |
| EP | 3 009 411 A1 | 4/2016 |
| EP | 3 009 412 A1 | 4/2016 |
| JP | 4-222630 A | 8/1992 |
| JP | 2001-509767 A | 7/2001 |
| JP | 2004-26547 A | 1/2004 |
| JP | 2005-49777 A | 2/2005 |
| JP | 4231406 B2 | 2/2009 |
| JP | 2010-222233 A | 10/2010 |
| JP | 2010-265160 A | 11/2010 |
| JP | 2011-154215 A | 8/2011 |
| JP | 2012-101999 A | 5/2012 |
| JP | 2012-106931 A | 6/2012 |
| JP | 2012-126639 A | 7/2012 |
| JP | 2015-24930 A | 2/2015 |
| RU | 2 375 321 C2 | 12/2009 |
| RU | 2 418 755 C2 | 5/2011 |
| WO | WO-01/25162 A1 | 4/2001 |
| WO | QO-2005/087680 A1 | 9/2005 |
| WO | WO-2010/098287 A1 | 9/2010 |
| WO | WO-2011/074425 A1 | 6/2011 |
| WO | WO-2012/008587 A1 | 1/2012 |
| WO | WO-2012/050078 A1 | 4/2012 |
| WO | WO-2012115198 A1 * | 8/2012 ............. B32B 27/18 |
| WO | WO-2014051139 A1 * | 4/2014 ............... C08K 5/12 |

OTHER PUBLICATIONS

Supplementary European Search Report for the Application No. EP 15 74 3027 dated Jun. 23, 2017.
Supplementary European Search Report for the Application No. EP 15 74 2749 dated Jun. 28, 2017.
Database WPI Week 201230 Thomson Scientific, London, GB; AN 2012-E49594, XP002770970.
International Search Report for the Application No. PCT/JP201 5/052774 dated Mar. 17, 2015.
Written Opinion of the International Searching Authority (PCT/ISA/237) for Application No. PCT/JP201 5/052774 dated Mar. 17, 2015.
International Search Report for the Application No. PCT/JP2015/052773 dated Mar. 17, 2015.
Written Opinion of the International Searching Authority (PCT/ISA/237) for Application No. PCT/JP2015/052773 dated Mar. 17, 2015.
European Office Action for Application No. 15 742 749.3 dated Feb. 22, 2019.
European Office Action for Application No. 15 743 027.3 dated Feb. 22, 2019.
Notification of Reasons for Refusal for the Application No. 2015-508908 from Japan Patent Office dated Feb. 19, 2019.
Notification of Reasons for Refusal for the Application No. 2015-510559 from Japan Patent Office dated Feb. 19, 2019.
Final Office Action for the U.S. Appl. No. 15/111,330 from the United States Patent and Trademark Office dated Mar. 5, 2019.
Non-Final Office Action for the U.S. Appl. No. 15/111,330 from United States Patent and Trademark Office dated Oct. 31, 2019.
Notification of Reasons for Refusal for the Application No. 2015-508908 from Japan Patent Office dated Nov. 12, 2019.
Notification of Reasons for Refusal for the Application No. 2015-510559 from Japan Patent Office dated Nov. 12, 2019.
Russian Office Action for the Application No. 2016135244 dated Aug. 10, 2018.
Russian Office Action for the Application No. 2016135246 dated Aug. 10, 2018.
European Office Action for the Application No. 15 743 027.3 dated Nov. 18, 2019.
European Office Action for the Application No. 15 742 749.3 dated Nov. 18, 2019.
Non-Final Office Action for the U.S. Appl. No. 15/111,330 from the United States Patent and Trademark Office dated May 30, 2018.
The First Office Action for the Application No. 201580003542.7 from the State Intellectual Property Office of the People's Republic of China dated Jun. 19, 2018.
The First Office Action for the Application No. 201580003549.9 from the State Intellectual Property Office of the People's Republic of China dated Jun. 4, 2018.
Indian Office Action for the Application No. 201637028168 dated May 9, 2019.
Non-Final Office Action for the U.S. Appl. No. 15/111,330 from United States Patent and Trademark Office dated Oct. 7, 2020.
Reconsideration Report for the Application No. 2015-508908 from Japan Patent Office dated Mar. 10, 2020.
Reconsideration Report for the Application No. 2015-510559 from Japan Patent Office dated Mar. 10, 2020.
European Search Report for the Application No. 21 185 752.9 dated Oct. 21, 2021.
Non-Final Office Action for the U.S. Appl. No. 17/192,843 from United States Patent and Trademark Office dated Jul. 7, 2022.

* cited by examiner

[FIG. 1]
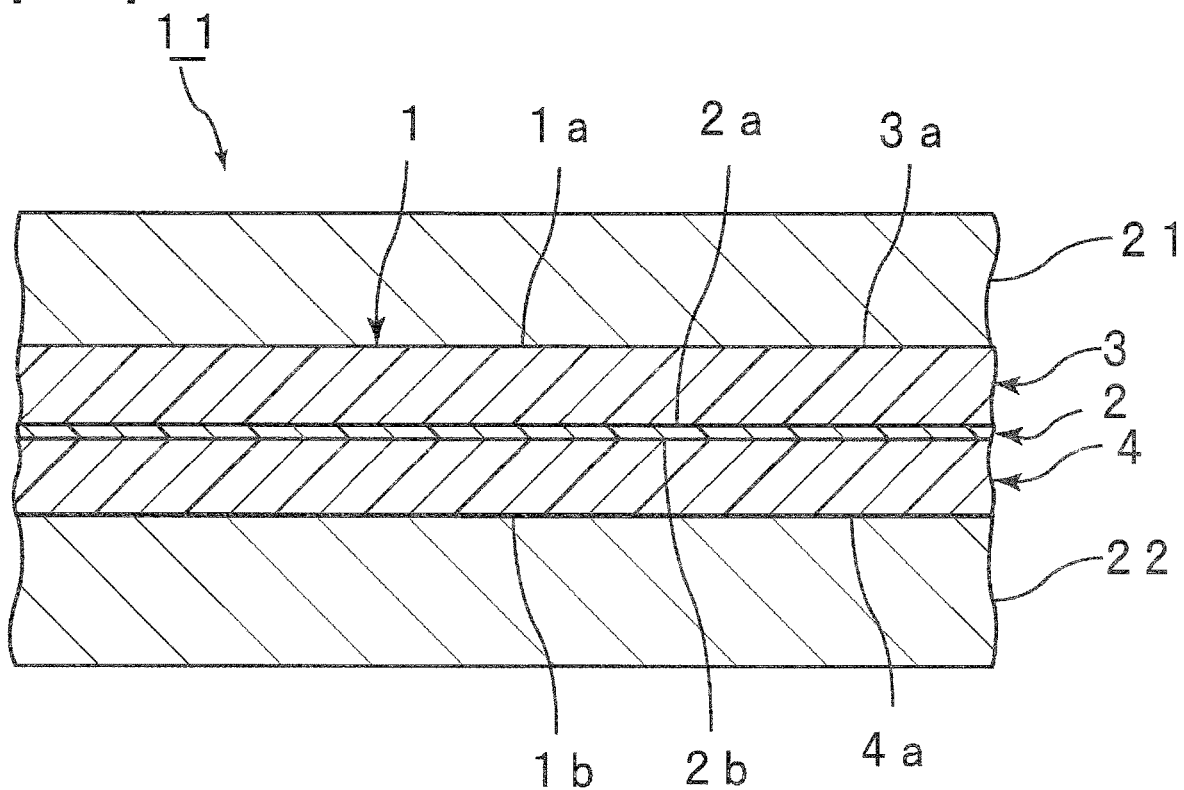
[FIG. 2]
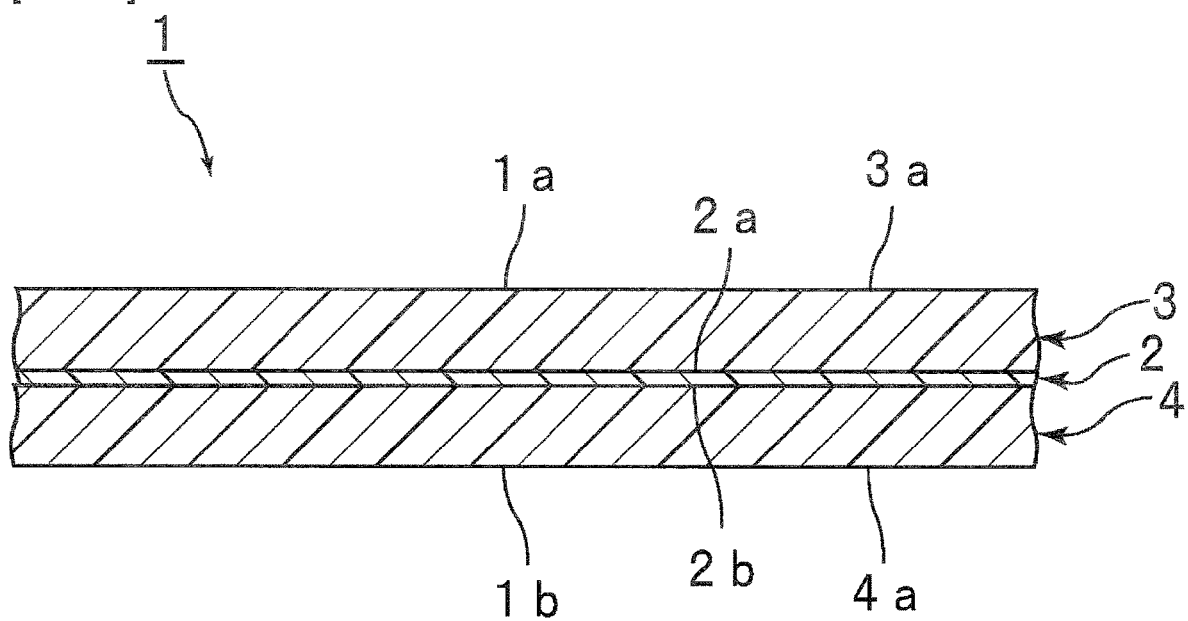

LAMINATED GLASS AND METHOD FOR FITTING LAMINATED GLASS

TECHNICAL FIELD

The present invention relates to laminated glass used for laminated glass of automobiles, buildings and the like. Moreover, the present invention relates to a method for fitting the laminated glass.

BACKGROUND ART

Since laminated glass generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching an interlayer film for laminated glass between a pair of glass plates. Such laminated glass used for the opening part of vehicles and buildings is required to have high heat shielding properties.

The energy amount of an infrared ray with a wavelength greater than or equal to 780 nm which is longer than that of visible light is small as compared with an ultraviolet ray. However, the thermal action of infrared rays is large, and when infrared rays are absorbed into a substance, heat is released from the substance. As such, infrared rays are generally called heat rays. Thus, in order to enhance the heat shielding properties of laminated glass, it is necessary to sufficiently cut off infrared rays.

As an interlayer film including heat shielding particles for effectively cutting off the infrared rays (heat rays), the following Patent Document 1 discloses an interlayer film including tin-doped indium oxide particles (ITO particles) or antimony-doped tin oxide particles (ATO particles). The following Patent Document 2 discloses an interlayer film including tungsten oxide particles.

RELATED ART DOCUMENT

Patent Document

Patent Document 1: WO 2001/025162 A1
Patent Document 2: WO 2005/087680 A1

SUMMARY OF THE INVENTION

Problems to be Solved by the Invention

In recent years, laminated glass prepared with an interlayer film is required to achieve both high heat shielding properties and high visible light transmittance (Visible Transmittance) at the same time. That is, with regard to the laminated glass, it is necessary to enhance the heat shielding properties while maintaining the visible light transmittance high.

However, there are cases where high heat shielding properties and high visible light transmittance cannot be achieved at the same time by the conventional laminated glass such as those described in Patent Documents 1 and 2.

An object of the present invention is to provide laminated glass which is high in heat shielding properties, and is to provide a method for fitting the laminated glass.

An object of the present invention with limitation is to provide laminated glass which is high in heat shielding properties and is high in visible light transmittance, and an object of the present invention with limitation is to provide a method for fitting the laminated glass.

Means for Solving the Problems

According to a broad aspect of the present invention, there is provided laminated glass including a first laminated glass member, a second laminated glass member and an interlayer film arranged between the first laminated glass member and the second laminated glass member, and the interlayer film includes an infrared ray reflection layer which reflects infrared rays, a first resin layer which is arranged on a first surface side of the infrared ray reflection layer and contains a thermoplastic resin and a second resin layer which is arranged on a second surface side opposite to the first surface of the infrared ray reflection layer and contains a thermoplastic resin, the first laminated glass member is arranged on the outside of the first resin layer in the interlayer film, the second laminated glass member is arranged on the outside of the second resin layer in the interlayer film, and the infrared ray transmittance in the wavelength of 780 to 2100 nm of the whole layer composed of the first laminated glass member and the first resin layer is higher by 15% or more than the infrared ray transmittance in the wavelength of 780 to 2100 nm of the whole layer composed of the second laminated glass member and the second resin layer.

The infrared ray transmittance in the wavelength of 780 to 2100 nm of the whole layer composed of the first laminated glass member and the first resin layer is preferably higher by 20% or more, more preferably higher by 30% or more, than the infrared ray transmittance in the wavelength of 780 to 2100 nm of the whole layer composed of the second laminated glass member and the second resin layer.

In a specific aspect of the laminated glass according to the present invention, the infrared ray transmittance in the wavelength of 780 to 2100 nm of the first resin layer is higher than the infrared ray transmittance in the wavelength of 780 to 2100 nm of the second resin layer, or the infrared ray transmittance in the wavelength of 780 to 2100 nm of the first laminated glass member is higher than the infrared ray transmittance in the wavelength of 780 to 2100 nm of the second laminated glass member.

In another specific aspect of the laminated glass according to the present invention, the infrared ray transmittance in the wavelength of 780 to 2100 nm of the first resin layer is higher than the infrared ray transmittance in the wavelength of 780 to 2100 nm of the second resin layer.

In yet another specific aspect of the laminated glass according to the present invention, the infrared ray transmittance in the wavelength of 780 to 2100 nm of the first laminated glass member is higher than the infrared ray transmittance in the wavelength of 780 to 2100 nm of the second laminated glass member.

In yet another specific aspect of the laminated glass according to the present invention, the infrared ray transmittance in the wavelength of 780 to 2100 nm of the first resin layer is higher than the infrared ray transmittance in the wavelength of 780 to 2100 nm of the second resin layer, and the infrared ray transmittance in the wavelength of 780 to 2100 nm of the first laminated glass member is higher than the infrared ray transmittance in the wavelength of 780 to 2100 nm of the second laminated glass member.

In yet another specific aspect of the laminated glass according to the present invention, the infrared ray transmittance in the wavelength of 780 to 2100 nm of the first resin layer is higher by 10% or more than the infrared ray transmittance in the wavelength of 780 to 2100 nm of the second resin layer, and the infrared ray transmittance in the wavelength of 780 to 2100 nm of the first laminated glass member is higher by 10% or more than the infrared ray transmittance in the wavelength of 780 to 2100 nm of the second laminated glass member.

In a different specific aspect of the laminated glass according to the present invention, the infrared ray reflection layer is a resin film with metal foil, a multilayer laminated film in which a metal layer and a dielectric layer are formed on a resin layer, a multilayer resin film or a liquid crystal film.

It is preferred that at least one among the first resin layer and the second resin layer contain an adhesive force regulating agent. It is more preferred that both of the first resin layer and the second resin layer contain an adhesive force regulating agent.

In another specific aspect of the laminated glass according to the present invention, the second resin layer contains metal oxide particles.

In yet another specific aspect of the laminated glass according to the present invention, the metal oxide particles are tin-doped indium oxide particles or tungsten oxide particles.

In a different specific aspect of the laminated glass according to the present invention, the second resin layer contains at least one kind among a phthalocyanine compound, a naphthalocyanine compound and an anthracyanine compound.

In a different specific aspect of the laminated glass according to the present invention, the thermoplastic resin in the first resin layer is a polyvinyl acetal resin and the thermoplastic resin in the second resin layer is a polyvinyl acetal resin.

In a further different specific aspect of the laminated glass according to the present invention, the first resin layer contains a plasticizer and the second resin layer contains a plasticizer.

In another specific aspect of the laminated glass according to the present invention, the first resin layer contains an ultraviolet ray shielding agent.

In yet another specific aspect of the laminated glass according to the present invention, the second resin layer contains an ultraviolet ray shielding agent.

According to a broad aspect of the present invention, there is provided a method for fitting the above-described laminated glass for a building or a vehicle into an opening part between an outer space and an inner space into which heat rays are made incident from the outer space, including the step of fitting the laminated glass into the opening part so that the first laminated glass member is positioned at the outer space side and the second laminated glass member is positioned at the inner space side.

Effect of the Invention

Since the laminated glass according to the present invention allows the first laminated glass member, the first resin layer, the infrared ray reflection layer, the second resin layer and the second laminated glass member to be superposedly arranged in this order and the infrared ray transmittance in the wavelength of 780 to 2100 nm of the whole layer composed of the first laminated glass member and the first resin layer is higher by 15% or more than the infrared ray transmittance in the wavelength of 780 to 2100 nm of the whole layer composed of the second laminated glass member and the second resin layer, it is possible to enhance the heat shielding properties.

BRIEF DESCRIPTION OF DRAWINGS

FIG. 1 is a partially cut-away sectional view showing laminated glass in accordance with one embodiment of the present invention.

FIG. 2 is a partially cut-away sectional view showing an interlayer film for laminated glass used for laminated glass in accordance with one embodiment of the present invention.

MODE(S) FOR CARRYING OUT THE INVENTION

Hereinafter, the present invention will be elucidated by describing specific embodiments and examples of the present invention with reference to the drawings.

FIG. 2 shows an interlayer film for laminated glass used for laminated glass in accordance with one embodiment of the present invention schematically represented as a partially cut-away sectional view.

An interlayer film 1 shown in FIG. 2 is a multilayer interlayer film. The interlayer film 1 is used for obtaining laminated glass. The interlayer film 1 is an interlayer film for laminated glass. The interlayer film 1 is provided with an infrared ray reflection layer 2, a first resin layer 3 arranged on a first surface 2a side of the infrared ray reflection layer 2 and a second resin layer 4 arranged on a second surface 2b side opposite to the first surface 2a of the infrared ray reflection layer 2. The first resin layer 3 is layered on the first surface 2a of the infrared ray reflection layer 2. The second resin layer 4 is layered on the second surface 2b of the infrared ray reflection layer 2. The infrared ray reflection layer 2 is an intermediate layer and has heat ray reflecting performance. In the present embodiment, the first and second resin layers 3 and 4 are surface layers. The infrared ray reflection layer 2 is arranged between the first and second resin layers 3 and 4. The infrared ray reflection layer 2 is sandwiched between the first and second resin layers 3 and 4. Accordingly, the interlayer film 1 has a multilayer structure in which the first resin layer 3, the infrared ray reflection layer 2 and the second resin layer 4 are layered in this order.

In this connection, other layers may be arranged between the infrared ray reflection layer 2 and the first resin layer 3 and between the infrared ray reflection layer 2 and the second resin layer 4, respectively. It is preferred that the first resin layer 3 and the second resin layer 4 each be directly layered on the infrared ray reflection layer 2. Examples of another layer include a layer containing a thermoplastic resin such as a polyvinyl acetal resin, a layer containing polyethylene terephthalate, polyethylene naphthalate and the like, and a layer formed of an inorganic compound such as metal foil. In the case where such other layers are included, only one kind of the layer may be included and two or more kinds of different layers may be included.

The infrared ray reflection layer reflects infrared rays. The infrared ray reflection layer is not particularly limited as long as the layer has infrared ray reflecting performance. Because the infrared ray reflection layer is allowed to be excellent in infrared ray reflecting performance, it is preferred that the infrared ray reflection layer have a characteristic having the infrared ray transmittance of less than or equal to 40% in at least one wavelength within the range of 800 to 2000 nm. In this connection, the infrared ray transmittance of an infrared ray reflection layer used in the example described below satisfies the above-mentioned preferred condition. In at least one wavelength within the range of 800 to 2000 nm, the infrared ray transmittance is more preferably less than or equal to 30% and further preferably less than or equal to 20%.

Examples of the infrared ray reflection layer include a resin film with metal foil, a multilayer laminated film in which a metal layer and a dielectric layer are formed on a resin layer, a film containing graphite, a multilayer resin film, a liquid crystal film, and the like. These films have infrared ray reflecting performance.

It is especially preferred that the infrared ray reflection layer be a resin film with metal foil, a multilayer laminated film in which a metal layer and a dielectric layer are formed on a resin layer, a multilayer resin film or a liquid crystal film. These films are highly excellent in infrared ray reflecting performance. Accordingly, by the use of these films, it is possible to obtain laminated glass in which the heat shielding properties are further enhanced and high visible light transmittance can be maintained over a longer period of time. The infrared ray reflection layer may be a resin film with metal foil, a multilayer resin film or a liquid crystal film.

The resin film with metal foil is provided with a resin film and metal foil layered on the outer surface of the resin film. Examples of the material for the resin film include a polyethylene terephthalate resin, a polyethylene naphthalate resin, a polyvinyl acetal resin, an ethylene-vinyl acetate copolymer resin, an ethylene-acryl copolymer resin, a polyurethane resin, a polyvinyl alcohol resin, a polyolefin resin, a polyvinyl chloride resin, a polyimide resin and the like. Examples of the material for the metal foil include aluminum, copper, silver, gold, palladium, an alloy containing these metals, and the like.

The multilayer laminated film in which a metal layer and a dielectric layer are formed on a resin layer is a multilayer laminated film in which metal layers and dielectric layers are alternately layered in an arbitrary number of layers on a resin layer (resin film).

Examples of the material for the resin layer (resin film) in the multilayer laminated film include the same material as the material for the resin film in the resin film with metal foil. Examples of the material for the resin layer (resin film) in the multilayer laminated film include polyethylene, polypropylene, polylactic acid, poly(4-methylpentene-1), polyvinylidene fluoride, a cyclic polyolefin, polymethyl methacrylate, polyvinyl chloride, polyvinyl alcohol, a polyamide such as nylon 6, 11, 12 and 66, polystyrene, polycarbonate, polyethylene terephthalate, polyethylene naphthalate, polyester, polyphenylene sulfide, polyetherimide and the like. Examples of the material for the metal layer in the multilayer laminated film include the same material as the material for the metal foil in the resin film with metal foil. On both sides or on one side of the metal layer, a coat layer of a metal or a mixed oxide can be provided. Examples of the material for the coat layer include ZnO, $Al_2O_3$, $Ga_2O_3$, $InO_3$, MgO, Ti, NiCr, Cu and the like.

Examples of the material for the dielectric layer in the multilayer laminated film include indium oxide and the like.

The multilayer resin film is a laminated film in which plural resin films are layered. Examples of the material for the multilayer resin film include the same material as the material for the resin layer (resin film) in the multilayer laminated film. The number of laminations of resin films in the multilayer resin film is greater than or equal to 2, may be greater than or equal to 3, and may be greater than or equal to 5. The number of laminations of resin films in the multilayer resin film may be less than or equal to 1000, may be less than or equal to 100, and may be less than or equal to 50.

The multilayer resin film may be a multilayer resin film in which two or more kinds of thermoplastic resin layers having a different optical property (refractive index) are alternately or randomly layered in an arbitrary number of layers. Such a multilayer resin film is constituted so that desired infrared ray reflecting performance is attained.

Examples of the liquid crystal film include a film prepared by layering cholesteric liquid crystal layers which reflect light with an arbitrary wavelength in an arbitrary number of layers. Such a liquid crystal film is constituted so that desired infrared ray reflecting performance is attained.

It is preferred that the infrared ray transmittance in the wavelength of 780 to 2100 nm of the first resin layer be higher than the infrared ray transmittance in the wavelength of 780 to 2100 nm of the second resin layer. In this case, considering from a different point of view, the infrared ray absorptance of the first resin layer is lower than the infrared ray absorptance of the second resin layer.

In the case where the infrared ray transmittance of the first resin layer is higher than the infrared ray transmittance of the second resin layer, the first resin layer transmits a relatively large quantity of infrared rays. As such, most of the infrared rays transmitted through the first resin layer reach the infrared ray reflection layer. Since the infrared ray reflection layer reflects infrared rays, infrared rays which have reached the infrared ray reflection layer are reflected by the infrared ray reflection layer. Moreover, because the infrared ray transmittance of the first resin layer is high, most of the infrared rays reflected by the infrared ray reflection layer are transmitted through the first resin layer. As a result, a rise in the temperature of an interlayer film at the time when infrared rays are made incident into the interlayer film can be suppressed. As such, the heat shielding properties of the interlayer film are enhanced, and furthermore, high visible light transmittance can be maintained over a long period of time since the interlayer film is excellent in light resistance. Moreover, by fitting laminated glass prepared with the interlayer film into an opening part of a building or a vehicle, a rise in the temperature of an inner space of a building or a vehicle can be effectively suppressed.

On the other hand, in the case where the infrared ray transmittance of the first resin layer is higher than the infrared ray transmittance of the second resin layer, if the first resin layer and the infrared ray reflection layer transmit a part of infrared rays at all, the transmitted infrared rays reach the second resin layer. When the infrared ray transmittance of the second resin layer is low, the second resin layer effectively cuts off the transmission of infrared rays. As such, the quantity of heat rays passing through the whole interlayer film can be reduced. This also enables the heat shielding properties of the interlayer film for laminated glass to be enhanced, and by fitting laminated glass prepared with the interlayer film for laminated glass into an opening part of a building or a vehicle, a rise in the temperature of an inner space of a building or a vehicle can be effectively suppressed.

The first resin layer and the second resin layer may be the same as or different from each other. It is preferred that the first resin layer and the second resin layer be different from each other. In the case where the infrared ray transmittance in the wavelength of 780 to 2100 nm of the first resin layer is higher than the infrared ray transmittance in the wavelength of 780 to 2100 nm of the second resin layer, the first resin layer and the second resin layer are different from each other in composition.

The first resin layer contains a thermoplastic resin. It is more preferred that the thermoplastic resin in the first resin layer be a polyvinyl acetal resin. It is preferred that the first resin layer contain a plasticizer, and it is more preferred that the first resin layer contain a polyvinyl acetal resin and a plasticizer. It is preferred that the first resin layer contain an ultraviolet ray shielding agent, and it is preferred that the first resin layer contain an oxidation inhibitor.

The second resin layer contains a thermoplastic resin. It is more preferred that the thermoplastic resin in the second resin layer be a polyvinyl acetal resin. It is preferred that the second resin layer contain a plasticizer, and it is more preferred that the second resin layer contain a polyvinyl acetal resin and a plasticizer. It is preferred that the second resin layer contain an ultraviolet ray shielding agent, and it is preferred that the second resin layer contain an oxidation inhibitor.

It is preferred that the second resin layer contain a heat shielding compound. By allowing the heat shielding compound to be contained in the second resin layer, the infrared ray transmittance of the first resin layer becomes higher than the infrared ray transmittance of the second resin layer. As a result, it is easy to make the infrared ray transmittance of the whole layer composed of the first laminated glass member and the first resin layer higher than the infrared ray transmittance of the whole layer composed of the second laminated glass member and the second resin layer.

It is preferred that the second resin layer contain a heat shielding compound. By allowing the heat shielding compound to be contained in the second resin layer, the infrared ray transmittance of the first resin layer becomes higher than the infrared ray transmittance of the second resin layer. The first resin layer may contain a heat shielding compound. Moreover, when the content (% by weight) of the heat shielding compound in the first resin layer is smaller than the content (% by weight) of the heat shielding compound in the second resin layer, it is easy to make the infrared ray transmittance of the first resin layer higher than the infrared ray transmittance of the second resin layer. Examples of the heat shielding compound include heat shielding particles such as metal oxide particles, at least one kind of ingredient among a phthalocyanine compound, a naphthalocyanine compound and an anthracyanine compound (hereinafter, sometimes referred to as Ingredient X), and the like. In this connection, the heat shielding compound means a compound capable of absorbing infrared rays. In the case where a plurality of heat shielding compounds are contained in the first resin layer or the second resin layer, the total content (% by weight) of the heat shielding compound in the first resin layer is preferably smaller than the total content (% by weight) of the heat shielding compound in the second resin layer, more preferably smaller by 0.05% by weight or more, further preferably smaller by 0.1% by weight or more, especially preferably smaller by 0.2% by weight or more and most preferably smaller by 0.4% by weight or more. Furthermore, because the heat shielding properties are further enhanced, it is preferred that the difference between the total content (% by weight) of the heat shielding compound in the second resin layer and the total content (% by weight) of the heat shielding compound in the first resin layer be less than or equal to 2% by weight.

When the infrared ray transmittance in the wavelength of 780 to 2100 nm of the whole layer composed of a first laminated glass member and a first resin layer is defined as T1 and the infrared ray transmittance in the wavelength of 780 to 2100 nm of the whole layer composed of a second laminated glass member and a second resin layer is defined as T2, T1 is higher by 15% or more than T2. As such, the heat shielding properties of laminated glass are enhanced. Because the heat shielding properties of laminated glass are further enhanced, it is preferred that T1 be higher by 20% or more than T2, it is more preferred that T1 be higher by 25% or more than T2, it is still more preferred that T1 be higher by 30% or more than T2, it is further preferred that T1 be higher by 35% or more than T2, it is still further preferred that T1 be higher by 40% or more than T2, it is especially preferred that T1 be higher by 45% or more than T2 and it is most preferred that T1 be higher by 50% or more than T2. Although the upper limit of a value of (T1−T2) is not particularly limited, because the transparency of laminated glass is further enhanced, it is preferred that (T1−T2) be less than or equal to 90%, it is more preferred that (T1−T2) be less than or equal to 85% and it is further preferred that (T1−T2) be less than or equal to 80%.

When the infrared ray transmittance in the wavelength of 780 to 2100 nm of the first resin layer is defined as Tx1 and the infrared ray transmittance in the wavelength of 780 to 2100 nm of the second resin layer is defined as Tx2, it is preferred that Tx1 be higher than Tx2. Because the heat shielding properties of laminated glass are further enhanced, it is preferred that Tx1 be higher by 10% or more than Tx2, it is more preferred that Tx1 be higher by 20% or more than Tx2, it is further preferred that Tx1 be higher by 25% or more than Tx2 and it is especially preferred that Tx1 be higher by 30% or more than Tx2. Although the upper limit of a value of (Tx1−Tx2) is not particularly limited, because the transparency of laminated glass is further enhanced, it is preferred that (Tx1−Tx2) be less than or equal to 70%, it is more preferred that (Tx1−Tx2) be less than or equal to 60%, it is further preferred that (Tx1−Tx2) be less than or equal to 50% and it is especially preferred that (Tx1−Tx2) be less than or equal to 40%. For the purpose of further enhancing the heat shielding properties and transparency of laminated glass, the preferred lower limit of Tx1 is 60%, the preferred upper limit thereof is 90%, the more preferred lower limit thereof is 65%, the more preferred upper limit thereof is 85%, the further preferred lower limit thereof is 70% and the further preferred upper limit thereof is 80%. Moreover, for the purpose of further enhancing the heat shielding properties and transparency of laminated glass, the preferred lower limit of Tx2 is 20%, the preferred upper limit thereof is 75%, the more preferred lower limit thereof is 25%, the more preferred upper limit thereof is 65%, the further preferred lower limit thereof is 30%, the further preferred upper limit thereof is 55%, the especially preferred lower limit thereof is 35% and the especially preferred upper limit thereof is 50%.

When the infrared ray transmittance in the wavelength of 780 to 2100 nm of a first laminated glass member is defined as Ty1 and the infrared ray transmittance in the wavelength of 780 to 2100 nm of a second laminated glass member is defined as Ty2, it is preferred that Ty1 be higher than Ty2. Because the heat shielding properties of laminated glass are further enhanced, it is preferred that Ty1 be higher by 10% or more than Ty2, it is more preferred that Ty1 be higher by 15% or more than Ty2 and it is further preferred that Ty1 be higher by 20% or more than Ty2. Although the upper limit of a value of (Ty1−Ty2) is not particularly limited, because the transparency of laminated glass is further enhanced, it is preferred that (Ty1−Ty2) be less than or equal to 50%, it is more preferred that (Ty1−Ty2) be less than or equal to 40%, it is further preferred that (Ty1−Ty2) be less than or equal to 30% and it is especially preferred that (Ty1−Ty2) be less than or equal to 25%. For the purpose of further enhancing the heat shielding properties and transparency of laminated glass, the preferred lower limit of Ty1 is 50%, the preferred upper limit thereof is 90%, the more preferred lower limit thereof is 55%, the more preferred upper limit thereof is 88%, the further preferred lower limit thereof is 60% and the further preferred upper limit thereof is 86%. Moreover, for the purpose of further enhancing the heat shielding properties and transparency of laminated glass, the preferred lower limit of Ty2 is 40%, the preferred upper limit thereof is 88%, the more preferred lower limit thereof is 45%, the more preferred upper limit thereof is 86%, the further preferred lower limit thereof is 55%, the further preferred upper limit thereof is 70%, the especially preferred lower limit thereof is 60% and the especially preferred upper limit thereof is 65%.

In this connection, the infrared ray transmittance T1 in the wavelength of 780 to 2100 nm of the whole layer composed of a first laminated glass member and a first resin layer is measured in the following manner.

Laminated glass in which a first laminated glass member, a first resin layer and a sheet of clear glass (2.5 mm in thickness) are layered in this order is prepared. Weighting factors in the range of 780 to 2100 nm among weighting factors in the range of 300 to 2100 nm shown in Appendix Table 2 in JIS R3106 (1998) are used, and each of weighting factors in the range of 780 to 2100 nm is divided by the total value of weighting factors in the range of 780 to 2100 nm to obtain a newly normalized weighting factor of the infrared ray transmittance in the range of 780 to 2100 nm. Then, the spectral transmittance in the wavelength of 780 to 2100 nm of a sheet of laminated glass is obtained in accordance with JIS R3106 (1998) using a spectrophotometer ("U-4100" available from Hitachi High-Technologies Corporation). The spectral transmittance obtained is multiplied by the newly normalized weighting factor to calculate the infrared ray transmittance T1 in the wavelength of 780 to 2100 nm.

The infrared ray transmittance T2 in the wavelength of 780 to 2100 nm of the whole layer composed of a second laminated glass member and a second resin layer is measured in the following manner.

Laminated glass in which a second laminated glass member, a second resin layer and a sheet of clear glass (2.5 mm in thickness) are layered in this order is prepared. Weighting factors in the range of 780 to 2100 nm among weighting factors in the range of 300 to 2100 nm shown in Appendix Table 2 in JIS R3106 (1998) are used, and each of weighting factors in the range of 780 to 2100 nm is divided by the total value of weighting factors in the range of 780 to 2100 nm to obtain a newly normalized weighting factor of the infrared ray transmittance in the range of 780 to 2100 nm. Then, the spectral transmittance in the wavelength of 780 to 2100 nm of a sheet of laminated glass is obtained in accordance with JIS R3106 (1998) using a spectrophotometer ("U-4100" available from Hitachi High-Technologies Corporation). The spectral transmittance obtained is multiplied by the newly normalized weighting factor to calculate the infrared ray transmittance T2 in the wavelength of 780 to 2100 nm.

Moreover, the infrared ray transmittance Tx1 or Tx2 in the wavelength of 780 to 2100 nm of the first resin layer or the second resin layer is measured in the following manner.

A first resin layer or a second resin layer is interposed between two sheets of clear glass (2.5 mm in thickness) to prepare laminated glass. Weighting factors in the range of 780 to 2100 nm among weighting factors in the range of 300 to 2100 nm shown in Appendix Table 2 in JIS R3106 (1998) are used, and each of weighting factors in the range of 780 to 2100 nm is divided by the total value of weighting factors in the range of 780 to 2100 nm to obtain a newly normalized weighting factor of the infrared ray transmittance in the range of 780 to 2100 nm. Then, the spectral transmittance in the wavelength of 780 to 2100 nm of a sheet of laminated glass is obtained in accordance with JIS R3106 (1998) using a spectrophotometer ("U-4100" available from Hitachi High-Technologies Corporation). The spectral transmittance obtained is multiplied by the newly normalized weighting factor to calculate the infrared ray transmittance T1 in the wavelength of 780 to 2100 nm.

Hereinafter, the details of materials constituting the first and second resin layers will be described.

(Thermoplastic Resin)

The first and second resin layers contain a thermoplastic resin. The thermoplastic resin is not particularly limited. As the thermoplastic resin, a conventionally known thermoplastic resin can be used. One kind of the thermoplastic resin may be used alone, and two or more kinds thereof may be used in combination. The thermoplastic resin in the first resin layer and the thermoplastic resin in the second resin layer may be the same as or different from each other.

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, and the like. Thermoplastic resins other than these may be used.

It is preferred that the thermoplastic resin be a polyvinyl acetal resin. By using a polyvinyl acetal resin and a plasticizer together, the adhesive force of each of the first and second resin layers to a laminated glass member and another layer such as an infrared ray reflection layer is further enhanced.

For example, the polyvinyl acetal resin can be produced by acetalizing polyvinyl alcohol with an aldehyde. For example, the polyvinyl alcohol can be produced by saponifying polyvinyl acetate. The saponification degree of the polyvinyl alcohol generally lies within the range of 70 to 99.8% by mole.

The average polymerization degree of the polyvinyl alcohol is preferably greater than or equal to 200, more preferably greater than or equal to 500, preferably less than or equal to 5000, more preferably less than or equal to 4000, further preferably less than or equal to 3500, especially preferably less than or equal to 3000 and most preferably less than or equal to 2500. When the average polymerization degree is greater than or equal to the above lower limit, the penetration resistance of laminated glass is further enhanced. When the average polymerization degree is less than or equal to the above upper limit, formation of an interlayer film is facilitated. In this connection, the average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin be 3 or 4. When the number of carbon atoms of the acetal group in the polyvinyl acetal resin is greater than or equal to 3, the glass transition temperature of the interlayer film is sufficiently lowered.

The aldehyde is not particularly limited. In general, an aldehyde with 1 to 10 carbon atoms is suitably used as the above-mentioned aldehyde. Examples of the aldehyde with 1 to carbon atoms include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. Of these, propionaldehyde, n-butyraldehyde, isobutyraldehyde, n-hexylaldehyde or n-valeraldehyde is preferred, propionaldehyde, n-butyraldehyde or isobutyraldehyde is more preferred, and n-butyraldehyde is further preferred. One kind of the aldehyde may be used alone, and two or more kinds thereof may be used in combination.

The content ratio of the hydroxyl group (the amount of hydroxyl groups) of the polyvinyl acetal resin is preferably greater than or equal to 15% by mole, more preferably greater than or equal to 18% by mole, further preferably greater than or equal to 20% by mole, especially preferably greater than or equal to 28% by mole, preferably less than or equal to 40% by mole, more preferably less than or equal to 35% by mole and further preferably less than or equal to 32% by mole. When the content ratio of the hydroxyl group is greater than or equal to the above lower limit, the adhesive force of the interlayer film is further enhanced. Moreover, when the content ratio of the hydroxyl group is less than or equal to the above upper limit, the flexibility of the interlayer film is enhanced and the handling of the interlayer film is facilitated.

The content ratio of the hydroxyl group of the polyvinyl acetal resin is a molar fraction, represented in percentage, obtained by dividing the amount of ethylene groups to which the hydroxyl group is bonded by the total amount of ethylene groups in the main chain. For example, the amount of ethylene groups to which the hydroxyl group is bonded can be measured in accordance with JIS K6726 "Testing methods for polyvinyl alcohol" to be determined.

The acetylation degree (the amount of acetyl groups) of the polyvinyl acetal resin is preferably greater than or equal to 0.1% by mole, more preferably greater than or equal to 0.3% by mole, further preferably greater than or equal to 0.5% by mole, preferably less than or equal to 30% by mole, more preferably less than or equal to 25% by mole, further preferably less than or equal to 20% by mole, especially preferably less than or equal to 15% by mole and most preferably less than or equal to 3% by mole. When the acetylation degree is greater than or equal to the above lower limit, the compatibility between the polyvinyl acetal resin and a plasticizer is enhanced. When the acetylation degree is less than or equal to the above upper limit, with regard to the interlayer film and laminated glass, the moisture resistance thereof is enhanced.

The acetylation degree is a molar fraction, represented in percentage, obtained by dividing a value obtained by subtracting the amount of ethylene groups to which the acetal group is bonded and the amount of ethylene groups to which the hydroxyl group is bonded from the total amount of ethylene groups in the main chain by the total amount of ethylene groups in the main chain. For example, the amount of ethylene groups to which the acetal group is bonded can be measured in accordance with JIS K6728 "Testing methods for polyvinyl butyral".

The acetalization degree of the polyvinyl acetal resin (the butyralization degree in the case of a polyvinyl butyral resin) is preferably greater than or equal to 60% by mole, more preferably greater than or equal to 63% by mole, preferably less than or equal to 85% by mole, more preferably less than or equal to 75% by mole and further preferably less than or equal to 70% by mole. When the acetalization degree is greater than or equal to the above lower limit, the compatibility between the polyvinyl acetal resin and a plasticizer is enhanced. When the acetalization degree is less than or equal to the above upper limit, the reaction time required for producing the polyvinyl acetal resin is shortened.

The acetalization degree is a value expressing the mole fraction determined by dividing the amount of ethylene groups to which the acetal group is bonded by the total amount of ethylene groups in the main chain in terms of percentage.

The acetalization degree can be calculated by a method in accordance with JIS K6728 "Testing methods for polyvinyl butyral".

In this connection, it is preferred that the content ratio of the hydroxyl group (the amount of hydroxyl groups), the acetalization degree (the butyralization degree) and the acetylation degree be calculated from the results measured by a method in accordance with JIS K6728 "Testing methods for polyvinyl butyral". In the case where the polyvinyl acetal resin is a polyvinyl butyral resin, it is preferred that the content ratio of the hydroxyl group (the amount of hydroxyl groups), the acetalization degree (the butyralization degree) and the acetylation degree be calculated from the results measured by a method in accordance with JIS K6728 "Testing methods for polyvinyl butyral".

(Plasticizer)

From the viewpoint of further enhancing the adhesive force of an interlayer film, it is preferred that the first resin layer contain a plasticizer, and it is preferred that the second resin layer contain a plasticizer. In the case where the thermoplastic resin in each of the first and second resin layers is a polyvinyl acetal resin, it is especially preferred that each of the first and second resin layers contain a plasticizer.

The plasticizer is not particularly limited. As the plasticizer, a conventionally known plasticizer can be used. One kind of the plasticizer may be used alone, and two or more kinds thereof may be used in combination.

Examples of the plasticizer include organic ester plasticizers such as a monobasic organic acid ester and a polybasic organic acid ester, phosphate plasticizers such as an organic phosphate plasticizer and an organic phosphite plasticizer, and the like. Of these, organic ester plasticizers are preferred. It is preferred that the plasticizer be a liquid plasticizer.

The monobasic organic acid ester is not particularly limited and examples thereof include a glycol ester obtained by the reaction of a glycol and a monobasic organic acid, an ester of triethylene glycol or tripropylene glycol and a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, hepthylic acid, n-octylic acid, 2-ethylhexanoic acid, n-nonylic acid, decylic acid, and the like.

The polybasic organic acid ester is not particularly limited and examples thereof include an ester compound of a polybasic organic acid and an alcohol having a linear or branched structure of 4 to 8 carbon atoms. Examples of the polybasic organic acid include adipic acid, sebacic acid, azelaic acid and the like.

The organic ester plasticizer is not particularly limited and examples thereof include triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic acid alkyd, a mixture of a phosphoric acid ester and an adipic acid ester, and the like. Organic ester plasticizers other than these may be used.

The organic phosphate plasticizer is not particularly limited and examples thereof include tributoxyethyl phosphate, isodecyl phenyl phosphate, triisopropyl phosphate and the like.

It is preferred that the plasticizer be a diester plasticizer represented by the following formula (1).

[Chemical 1]

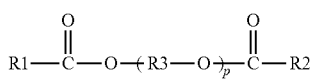

Formula (1)

In the foregoing formula (1), R1 and R2 each represent an organic group with 2 to 10 carbon atoms, R3 represents an ethylene group, an isopropylene group or an n-propylene group, and p represents an integer of 3 to 10. It is preferred that R1 and R2 in the foregoing formula (1) each be an organic group with 5 to 10 carbon atoms, and it is more preferred that R1 and R2 each be an organic group with 6 to 10 carbon atoms.

It is preferred that the plasticizer include at least one kind among triethylene glycol di-2-ethylhexanoate (3GO) and triethylene glycol di-2-ethylbutyrate (3GH), and it is more preferred that the plasticizer include triethylene glycol di-2-ethylhexanoate.

The content of the plasticizer is not particularly limited. In each of the first and second resin layers, relative to 100 parts by weight of the thermoplastic resin, the content of the plasticizer is preferably greater than or equal to 25 parts by weight, more preferably greater than or equal to 30 parts by weight, further preferably greater than or equal to 35 parts by weight, preferably less than or equal to 75 parts by weight, more preferably less than or equal to 60 parts by weight, further preferably less than or equal to 50 parts by weight and especially preferably less than or equal to 40 parts by weight. When the content of the plasticizer is greater than or equal to the above lower limit, the penetration resistance of laminated glass is further enhanced. When the content of the plasticizer is less than or equal to the above upper limit, the transparency of the interlayer film is further enhanced.

(Heat Shielding Compound)
Ingredient X:

It is preferred that the second resin layer contain a heat shielding compound. It is preferred that the second resin layer contain at least one kind of Ingredient X among a phthalocyanine compound, a naphthalocyanine compound and an anthracyanine compound. It is preferred that the second resin layer contain at least one kind of Ingredient X among a phthalocyanine compound, a naphthalocyanine compound and an anthracyanine compound or contain heat shielding particles described below. The first resin layer may contain the Ingredient X. The Ingredient X is a heat shielding compound. By allowing the Ingredient X to be used in at least one layer among the interlayer film as a whole, infrared rays (heat rays) can be effectively cut off. By allowing the Ingredient X to be contained in the second resin layer, infrared rays can be further effectively cut off.

The Ingredient X is not particularly limited. As the Ingredient X, conventionally known phthalocyanine compound, naphthalocyanine compound and anthracyanine compound can be used. One kind of the Ingredient X may be used alone, and two or more kinds thereof may be used in combination.

Examples of the Ingredient X include phthalocyanine, a derivative of phthalocyanine, naphthalocyanine, a derivative of naphthalocyanine, anthracyanine, a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

From the viewpoint of further enhancing the heat shielding properties of the interlayer film and laminated glass, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. From the viewpoint of still further enhancing the heat shielding properties of the interlayer film and the laminated glass, it is preferred that the Ingredient X have a structural unit in which an oxygen atom is bonded to a vanadium atom.

In the case where the first resin layer or the second resin layer contains the Ingredient X, in 100% by weight of each of the first and second resin layers, the content of the Ingredient X is preferably greater than or equal to 0.001% by weight, more preferably greater than or equal to 0.005% by weight, further preferably greater than or equal to 0.01% by weight, especially preferably greater than or equal to 0.02% by weight, preferably less than or equal to 0.2% by weight, more preferably less than or equal to 0.1% by weight, further preferably less than or equal to 0.05% by weight, especially preferably less than or equal to 0.04% by weight and most preferably less than or equal to 0.02% by weight. When the content of the Ingredient X in each of the first and second resin layers is greater than or equal to the above lower limit and less than or equal to the above upper limit, the heat shielding properties are sufficiently enhanced and the visible light transmittance is sufficiently enhanced. For example, it is possible to make the visible light transmittance greater than or equal to 70%.

Heat Shielding Particles:

It is preferred that the second resin layer contain heat shielding particles. The first resin layer may contain heat shielding particles. The heat shielding particle is a heat shielding compound. By allowing a heat shielding compound to be used in at least one layer among the interlayer film as a whole, infrared rays (heat rays) can be effectively cut off. By allowing heat shielding particles to be contained in the second resin layer, infrared rays can be further effectively cut off.

From the viewpoint of further enhancing the heat shielding properties of laminated glass, it is more preferred that the heat shielding particles be metal oxide particles. It is preferred that the heat shielding particle be a particle (a metal oxide particle) formed from an oxide of a metal. One kind of the heat shielding particles may be used alone, and two or more kinds thereof may be used in combination.

The energy amount of an infrared ray with a wavelength greater than or equal to 780 nm which is longer than that of visible light is small as compared with an ultraviolet ray. However, the thermal action of infrared rays is large, and once infrared rays are absorbed into a substance, heat is released from the substance. As such, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles) tin-doped zinc oxide particles and silicon-doped zinc oxide particles, lanthanum hexaboride ($LaB_6$) particles, and the like. Heat shielding particles other than these may be used. Of these, since the heat ray shielding function is high, preferred are metal oxide particles, more preferred are ATO particles, GZO particles, IZO particles, ITO particles or tungsten oxide particles, and especially preferred are ITO particles or tungsten oxide particles. In particular, since the heat ray shielding function is high and the particles are readily available, preferred are tin-doped indium oxide particles (ITO particles), and also preferred are tungsten oxide particles.

The tungsten oxide particles are generally represented by the following formula (X1) or the following formula (X2). In the interlayer film for laminated glass according to the present invention, the tungsten oxide particles represented by the following formula (X1) or the following formula (X2) are suitably used.

$$W_y O_z \quad \text{Formula (X1)}$$

In the foregoing formula (X1), W represents tungsten, O represents oxygen, and y and z satisfy the relation of $2.0 < z/y < 3.0$.

$$M_x W_y O_z \quad \text{Formula (X2)}$$

In the foregoing formula (X2), M represents at least one kind of element selected from the group consisting of H, He, an alkali metal, an alkaline earth metal, a rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta and Re, W represents tungsten, O represents oxygen, and x, y and z satisfy the relations of $0.001 \leq x/y \leq 1$ and $2.0 < z/y \leq 3.0$.

From the viewpoint of further enhancing the heat shielding properties of the interlayer film and laminated glass, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

From the viewpoint of further enhancing the heat shielding properties of the interlayer film and laminated glass, cesium-doped tungsten oxide particles are especially preferred. From the viewpoint of still further enhancing the heat shielding properties of the interlayer film and laminated glass, it is preferred that the cesium-doped tungsten oxide particles be tungsten oxide particles represented by the formula: $Cs_{0.33} WO_3$.

The average particle diameter of the heat shielding particles is preferably greater than or equal to 0.01 μm, more preferably greater than or equal to 0.02 μm, preferably less than or equal to 0.1 μm and more preferably less than or equal to 0.05 μm. When the average particle diameter is greater than or equal to the above lower limit, the heat ray shielding properties are sufficiently enhanced. When the average particle diameter is less than or equal to the above upper limit, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In the case where the first resin layer or the second resin layer contains the heat shielding particles, in 100% by weight of each of the first and second resin layers, the content of the heat shielding particles is preferably greater than or equal to 0.01% by weight, more preferably greater than or equal to 0.1% by weight, further preferably greater than or equal to 1% by weight, especially preferably greater than or equal to 1.5% by weight, preferably less than or equal to 6% by weight, more preferably less than or equal to 5.5% by weight, further preferably less than or equal to 4% by weight, especially preferably less than or equal to 3.5% by weight and most preferably less than or equal to 3.0% by weight. When the content of the heat shielding particles is greater than or equal to the above lower limit and less than or equal to the above upper limit, the heat shielding properties are sufficiently enhanced and the visible light transmittance is sufficiently enhanced.

In the case where the first resin layer or the second resin layer contains the heat shielding particles, it is preferred that each of the first and second resin layers contain the heat shielding particles in a proportion of 0.1 to 12 g/m². In the case where the proportion of the heat shielding particles lies within the above-mentioned range, the heat shielding properties are sufficiently enhanced and the visible light transmittance is sufficiently enhanced. The proportion of the heat shielding particles is preferably greater than or equal to 0.5 g/m², more preferably greater than or equal to 0.8 g/m², further preferably greater than or equal to 1.5 g/m², especially preferably greater than or equal to 3 g/m², preferably less than or equal to 11 g/m², more preferably less than or equal to 10 g/m² further preferably less than or equal to 9 g/m² and especially preferably less than or equal to 7 g/m². When the proportion is greater than or equal to the above lower limit, the heat shielding properties are further enhanced. When the proportion is less than or equal to the above upper limit, the visible light transmittance is further enhanced.

(Ultraviolet Ray Shielding Agent)

It is preferred that the first resin layer contain an ultraviolet ray shielding agent. It is preferred that the second resin layer contain an ultraviolet ray shielding agent. It is more preferred that both of the first resin layer and the second resin layer contain an ultraviolet ray shielding agent. By the use of an ultraviolet ray shielding agent, even when the interlayer film and the laminated glass are used for a long period of time, the visible light transmittance becomes further difficult to be lowered. One kind of the ultraviolet ray shielding agent may be used alone, and two or more kinds thereof may be used in combination.

The ultraviolet ray shielding agent includes an ultraviolet ray absorber. It is preferred that the ultraviolet ray shielding agent be an ultraviolet ray absorber.

Examples of a common ultraviolet ray shielding agent which is heretofore widely known include a metal-based ultraviolet ray shielding agent, a metal oxide-based ultraviolet ray shielding agent, a benzotriazole-based ultraviolet ray shielding agent (a benzotriazole compound), a benzophenone-based ultraviolet ray shielding agent (a benzophenone compound), a triazine-based ultraviolet ray shielding agent (a triazine compound), a malonic acid ester-based ultraviolet ray shielding agent (a malonic acid ester compound), an oxanilide-based ultraviolet ray shielding agent (an oxanilide compound), a benzoate-based ultraviolet ray shielding agent (a benzoate compound) and the like.

Examples of the metal-based ultraviolet ray shielding agent include platinum particles, particles in which the surface of platinum particles is coated with silica, palladium particles, particles in which the surface of palladium particles is coated with silica, and the like. It is preferred that the ultraviolet ray shielding agent not be heat shielding particles.

Examples of the metal oxide-based ultraviolet ray shielding agent include zinc oxide, titanium oxide, cerium oxide and the like. Furthermore, as the metal oxide-based ultraviolet ray shielding agent, the surface thereof may be coated. Examples of a coating material for the surface of the metal oxide-based ultraviolet ray shielding agent include an insulating metal oxide, a hydrolyzable organosilicon compound, a silicone compound and the like.

Examples of the insulating metal oxide include silica, alumina, zirconia and the like. For example, the insulating metal oxide has a band-gap energy greater than or equal to 5.0 eV.

Examples of the benzotriazole-based ultraviolet ray shielding agent include benzotriazole-based ultraviolet ray shielding agents such as 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.) and 2-(2'-hydroxy-3',5'-di-amylphenyl)benzotriazole ("Tinuvin 328" available from BASF Japan Ltd.). It is preferred that the benzotriazole-based ultraviolet ray shielding agent be a benzotriazole-based ultraviolet ray shielding agent containing halogen atoms, and it is more preferred that the ultraviolet ray shielding agent be a benzotriazole-based ultraviolet ray shielding agent containing chlorine atoms, since those are excellent in ultraviolet ray absorbing performance.

Examples of the benzophenone-based ultraviolet ray shielding agent include octabenzone ("Chimassorb 81" available from BASF Japan Ltd.) and the like.

Examples of the triazine-based ultraviolet ray shielding agent include 2-(4,6-diphenyl-1,3,5-triazine-2-yl)-5-[(hexyl)oxy]-phenol ("Tinuvin 1577FF" available from BASF Japan Ltd.) and the like.

Examples of the malonic acid ester-based ultraviolet ray shielding agent include dimethyl-2-(p-methoxybenzylidene)malonate, tetraethyl-2,2-(1,4-phenylenedimethylidyne)bismalonate, 2-(p-methoxybenzylidene)-bis(1,2,2,6,6-pentamethyl-4-piperidinyl)malonate and the like.

Examples of a commercial product of the malonic acid ester-based ultraviolet ray shielding agent include Hostavin B-CAP, Hostavin PR-25 and Hostavin PR-31 (any of these is available from Clariant Japan K.K.).

Examples of the oxanilide-based ultraviolet ray shielding agent include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxy-phenyl)oxalic acid diamide and 2-ethyl-2'-ethoxy-oxanilide ("Sanduvor VSU" available from Clariant Japan K.K.).

Examples of the benzoate-based ultraviolet ray shielding agent include 2,4-di-tert-butylphenyl-3,5-di-tert-butyl-4-hydroxybenzoate ("Tinuvin 120" available from BASF Japan Ltd.) and the like.

With regard to the interlayer film and laminated glass, in order to suppress the lowering invisible light transmittance thereof after the lapse of time, it is preferred that the ultraviolet ray shielding agent be 2-(2'-hydroxy-3'-t-butyl-5-methylphenyl)-5-chlorobenzotriazole ("Tinuvin 326" available from BASF Japan Ltd.) or 2-(2'-hydroxy-3',5'-di-amylphenyl)benzotriazole ("Tinuvin 328" available from BASF Japan Ltd.), and the ultraviolet ray shielding agent may be 2-(2'-hydroxy-3'-t-butyl-5-methylphenyl)-5-chlorobenzotriazole.

In the case where each of the first and second resin layers contains the ultraviolet ray shielding agent, in 100% by weight of each of the first and second resin layers, the content of the ultraviolet ray shielding agent is preferably greater than or equal to 0.1% by weight, more preferably greater than or equal to 0.2% by weight, further preferably greater than or equal to 0.3% by weight, especially preferably greater than or equal to 0.5% by weight, preferably less than or equal to 2.5% by weight, more preferably less than or equal to 2% by weight, further preferably less than or equal to 1% by weight and especially preferably less than or equal to 0.8% by weight. When the content of the ultraviolet ray shielding agent is greater than or equal to the above lower limit and less than or equal to the above upper limit, the lowering invisible light transmittance after the lapse of time is further suppressed. In particular, by allowing the content of the ultraviolet ray shielding agent to be greater than or equal to 0.2% by weight in 100% by weight of each of the first and second resin layers, with regard to the interlayer film and laminated glass, the lowering invisible light transmittance thereof after the lapse of time can be significantly suppressed. Furthermore, when the content of the ultraviolet ray shielding agent in 100% by weight of the second resin layer is greater than the content of the ultraviolet ray shielding agent in 100% by weight of the first resin layer, with regard to the interlayer film and laminated glass, the lowering in visible light transmittance thereof after the lapse of time can be further significantly suppressed.

(Oxidation Inhibitor)

It is preferred that the first resin layer contain an oxidation inhibitor. It is preferred that the second resin layer contain an oxidation inhibitor. It is preferred that both of the first resin layer and the second resin layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor and the like. The phenol-based oxidation inhibitor is an oxidation inhibitor having a phenol skeleton. The sulfur-based oxidation inhibitor is an oxidation inhibitor containing a sulfur atom.

The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butylated hydroxyanisole (BHA), 2,6-di-t-butyl-4-ethylphenol, stearyl-β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenyl)butane, 1,3,5-trimethyl-2,4,6-tris(3,5-di-t-butyl-4-hydroxybenzyl)benzene, bis(3,3'-t-butylphenol) butyric acid glycol ester, bis(3-t-butyl-4-hydroxy-5-methylbenzenepropanoic acid)ethylenebis(oxyethylene), and the like. One kind or two or more kinds among these oxidation inhibitors are suitably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl)phosphite, bis(2,4-di-t-butyl-6-methylphenyl)ethyl ester phosphorous acid, tris(2,4-di-t-butylphenyl)phosphite, 2,2'-methylenebis(4,6-di-t-butyl-1-phenyloxy) (2-ethylhexyloxy)phosphorus, and the like. One kind or two or more kinds among these oxidation inhibitors are suitably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "Irganox 1010" available from Nihon Ciba-Geigy K.K., and the like.

In the case where each of the first and second resin layers contains the oxidation inhibitor, in 100% by weight of each of the first and second resin layers, the content of the oxidation inhibitor is preferably greater than or equal to 0.1% by weight, preferably less than or equal to 2% by weight and more preferably less than or equal to 1.8% by weight. When the content of the oxidation inhibitor is greater than or equal to the above lower limit, with regard to the interlayer film and laminated glass, high visible light transmittance thereof is maintained over a longer period of time. When the content of the oxidation inhibitor is less than or equal to the above upper limit, an effect commensurate with the addition of an oxidation inhibitor becomes easy to be attained.

(Adhesive Force Regulating Agent)

It is preferred that at least one among the first resin layer and the second resin layer contain an adhesive force regulating agent. It is preferred that the first resin layer contain an adhesive force regulating agent. It is preferred that the second resin layer contain an adhesive force regulating agent. It is more preferred that both of the first resin layer and the second resin layer contain an adhesive force regulating agent. By the use of an adhesive force regulating agent, the adhesivity between the interlayer film and a sheet of glass is controlled, and laminated glass which is excellent in penetration resistance is obtained. Furthermore, by allowing an adhesive force regulating agent to be contained in the first resin layer and the second resin layer, in the case where a falling-ball test as the test for penetration resistance is performed, an effect of enabling glass fragments of laminated glass to become smaller in size is exerted. In particular, when the adhesive force regulating agent is a metal salt, glass fragments of laminated glass become further smaller in size. One kind of the adhesive force regulating agent may be used alone, and two or more kinds thereof may be used in combination.

The adhesive force regulating agent is not particularly limited, it is preferred that the adhesive force regulating agent be a metal salt, and it is preferred that the adhesive force regulating agent be at least one kind of metal salt selected from the group consisting of an alkali metal salt, an alkaline earth metal salt and an Mg salt. It is preferred that the metal salt contain at least one kind of metal among K and Mg. It is more preferred that the metal salt be an alkali metal salt of an organic acid with 2 to 16 carbon atoms or an alkaline earth metal salt of an organic acid with 2 to 16 carbon atoms, and it is further preferred that the metal salt be a magnesium carboxylate with 2 to 16 carbon atoms or a potassium carboxylate with 2 to 16 carbon atoms. Although the magnesium carboxylate with 2 to 16 carbon atoms and the potassium carboxylate with 2 to 16 carbon atoms are not particularly limited, examples thereof include magnesium acetate, potassium acetate, magnesium propionate, potassium propionate, magnesium 2-ethylbutanoate, potassium 2-ethylbutanoate, magnesium 2-ethylhexanoate, potassium 2-ethylhexanoate, and the like.

The content of the adhesive force regulating agent is not particularly limited. In each of the first resin layer and the second resin layer, with regard to the content of the adhesive force regulating agent relative to 100 parts by weight of the thermoplastic resin, the preferred lower limit is 0.0005 part by weight and the preferred upper limit is 0.05 part by weight. When the content of the adhesive force regulating agent is greater than or equal to 0.0005 part by weight, the penetration resistance of laminated glass is enhanced. When the content of the adhesive force regulating agent is less than or equal to 0.05 part by weight, the transparency of the interlayer film for laminated glass is further enhanced. The more preferred lower limit of the content of the adhesive force regulating agent is 0.002 part by weight and the more preferred upper limit thereof is 0.02 part by weight. Moreover, in a surface layer which is brought into contact with a laminated glass member in the case where each of the first and second resin layers has a two or more-layered structure, and in each of the first and second resin layers in the case where each of the first and second resin layers has a single-layer structure, with regard to the content of the adhesive force regulating agent relative to 100 parts by weight of the thermoplastic resin, the preferred lower limit is 0.0005 part by weight and the preferred upper limit is 0.05 part by weight.

Because the moisture resistance of the first resin layer is enhanced, it is preferred that the total of the contents of the alkali metal, the alkaline earth metal and Mg in each of the first and second resin layers be less than or equal to 300 ppm. For example, the alkali metal, the alkaline earth metal and Mg may be contained as metals derived from an adhesive force regulating agent mentioned above and may be contained as metals derived from a neutralizing agent used at the time of synthesizing a polyvinyl acetal resin. It is more preferred that the total of the contents of the alkali metal, the alkaline earth metal and Mg in each of the first and second resin layers be less than or equal to 200 ppm, it is further preferred that the total thereof be less than or equal to 150 ppm, and it is especially preferred that the total thereof be less than or equal to 100 ppm. Moreover, in a surface layer which is brought into contact with a laminated glass member in the case where each of the first and second resin layers has a two or more-layered structure, and in each of the first and second resin layers in the case where each of the first and second resin layers has a single-layer structure, it is preferred that the total of the contents of the alkali metal, the alkaline earth metal and Mg be less than or equal to 300 ppm, it is more preferred that the total thereof be less than or equal to 200 ppm, it is further preferred that the total thereof be less than or equal to 150 ppm, and it is especially preferred that the total thereof be less than or equal to 100 ppm.

(Other Ingredients)

The interlayer film for laminated glass may include additives such as a light stabilizer, a flame retardant, an antistatic agent, a pigment, a dye, a moisture-resistance improving agent and a fluorescent brightening agent, as necessary. One kind of these additives may be used alone, and two or more kinds thereof may be used in combination.

(Other Details of Interlayer Film for Laminated Glass)

The interlayer film for laminated glass is arranged between a first laminated glass member and a second laminated glass member to be used.

It is preferred that the interlayer film for laminated glass be used for obtaining laminated glass which is fitted into an opening part between an outer space (first space) and an inner space (second space) into which heat rays are made incident from the outer space for a building or a vehicle. In this case, it is preferred that, among the first and second resin layers, the first resin layer be arranged so as to be positioned at the outer space side.

The thickness of the interlayer film for laminated glass is not particularly limited. From the viewpoint of the practical aspect and the viewpoint of sufficiently enhancing the heat shielding properties, the thickness of the interlayer film is preferably greater than or equal to 0.1 mm, more preferably greater than or equal to 0.25 mm, preferably less than or equal to 3 mm and more preferably less than or equal to 1.5 mm. When the thickness of the interlayer film is greater than or equal to the above lower limit, the penetration resistance of laminated glass is enhanced.

The thickness of the infrared ray reflection layer is preferably greater than or equal to 0.01 mm, more preferably greater than or equal to 0.04 mm, further preferably greater than or equal to 0.07 mm, preferably less than or equal to 0.3 mm, more preferably less than or equal to 0.2 mm, further preferably less than or equal to 0.18 mm and especially preferably less than or equal to 0.16 mm. When the thickness of the infrared ray reflection layer is greater than or equal to the above lower limit, the heat shielding properties of laminated glass are further enhanced. When the thickness of the infrared ray reflection layer is less than or equal to the above upper limit, the transparency of laminated glass is further enhanced.

The thickness of each of the first and second resin layers is preferably greater than or equal to 0.1 mm, more preferably greater than or equal to 0.2 mm, further preferably greater than or equal to 0.25 mm, especially preferably greater than or equal to 0.3 mm, preferably less than or equal to 1.0 mm, more preferably less than or equal to 0.6 mm, still more preferably less than or equal to 0.5 mm, further preferably less than or equal to 0.45 mm and especially preferably less than or equal to 0.4 mm. When the thickness of the first or second resin layer is greater than or equal to the above lower limit, the penetration resistance of laminated glass is further enhanced. When the thickness of the first or second resin layer is less than or equal to the above upper limit, the transparency of laminated glass is further enhanced.

The production method of the interlayer film for laminated glass is not particularly limited. As the production method of the interlayer film, a conventionally known method can be used. Examples thereof include a production method of kneading respective ingredients described above and forming the kneaded product into an interlayer film, and the like. A production method of extrusion-molding is preferred because the method is suitable for continuous production. In particular, it is preferred that the first and second resin layers be formed by extrusion molding.

The method for kneading is not particularly limited. Examples of this method include a method using an extruder, a plastograph, a kneader, a banbury mixer, a calender roll, or the like. Of these, a method using an extruder is preferred and a method using a twin screw extruder is more preferred because the methods are suitable for continuous production.

In this connection, at the time of obtaining the interlayer film for laminated glass according to the present invention, a first resin layer, an infrared ray reflection layer and a second resin layer are separately prepared, after which the first resin layer, the infrared ray reflection layer and the second resin layer may be layered to obtain an interlayer film, and the layering method is not particularly limited. Examples of the layering method include a heat lamination method and the like.

Moreover, a first resin layer, an infrared ray reflection layer and a second resin layer may be layered by coextrusion to obtain an interlayer film. Moreover, a first resin layer and an infrared ray reflection layer may be coextruded to prepare a coextruded product and a second resin layer may be layered on the infrared ray reflection layer side of the coextruded product to obtain an interlayer film. A second resin layer and an infrared ray reflection layer may be coextruded to prepare a coextruded product and a first resin layer may be layered on the infrared ray reflection layer side of the coextruded product to obtain an interlayer film.

Moreover, by allowing compositions for forming first and second resin layers to be coated on surfaces of the infrared ray reflection layer, the first and second resin layers may be formed to obtain an interlayer film.

Because the interlayer film is allowed to be excellent in production efficiency, it is preferred that respective polyvinyl acetal resins contained in the first resin layer and the second resin layer be the same as each other, it is more preferred that respective polyvinyl acetal resins contained therein be the same as each other and respective plasticizers contained therein be the same as each other, and it is further preferred that the first resin layer and the second resin layer be formed from the same resin composition as each other. On the other hand, from the viewpoint of further enhancing heat shielding properties, it is preferred that the first resin layer and the second resin layer be formed from different resin compositions from each other.

(Laminated Glass)

The laminated glass according to the present invention is provided with a first laminated glass member, a second laminated glass member and an interlayer film arranged between the first and second laminated glass members. The interlayer film is the above-described interlayer film for laminated glass. The first laminated glass member is arranged on the outside of the first resin layer in the interlayer film. The second laminated glass member is arranged on the outside of the second resin layer in the interlayer film. The infrared ray transmittance in the wavelength of 780 to 2100 nm of the whole layer composed of the first laminated glass member and the first resin layer is higher than the infrared ray transmittance in the wavelength of 780 to 2100 nm of the whole layer composed of the second laminated glass member and the second resin layer.

The infrared ray transmittance of the whole layer composed of the first laminated glass member and the first resin layer is the infrared ray transmittance of a laminate composed of the first laminated glass member and the first resin layer. The infrared ray transmittance of the whole layer composed of the second laminated glass member and the second resin layer is the infrared ray transmittance of a laminate composed of the second laminated glass member and the second resin layer.

Laminated glass prepared with an interlayer film has hitherto been sometimes low in heat shielding properties and sometimes high in Tts (Total solar energy transmitted through a glazing) Furthermore, with regard to the conventional laminated glass, there is a problem that achieving both low Tts and high visible light transmittance (Visible Transmittance) at the same time is difficult.

In contrast, in the case where the laminated glass is provided with an interlayer film arranged between first and second laminated glass members, the interlayer film is provided with the infrared ray reflection layer and the first and second resin layers, and the infrared ray transmittance in the wavelength of 780 to 2100 nm of the whole layer composed of the first laminated glass member and the first resin layer is higher than the infrared ray transmittance in the wavelength of 780 to 2100 nm of the whole layer composed of the second laminated glass member and the second resin layer, it is possible to enhance the heat shielding properties of laminated glass. Furthermore, it is possible to enhance the visible light transmittance of the laminated glass. In the present invention, it is possible to obtain laminated glass which is low in Tts serving as an index of heat shielding properties, and furthermore, it is possible to obtain laminated glass which is high in visible light transmittance as described above. For example, it is possible to make the Tts of laminated glass less than or equal to 60% and make the visible light transmittance greater than or equal to 65%. Furthermore, it is also possible to make the Tts less than or equal to 55%, it is also possible to make the Tts less than or equal to 50%, and furthermore, it is possible to make the visible light transmittance greater than or equal to 70%.

Moreover, since the laminated glass is provided with the above-described configuration, it is possible to lower the Tds (Solar Direct Transmittance) serving as an index of heat shielding properties. For example, it is possible to make the Tds of laminated glass less than or equal to 50%, it is also possible to make the Tds less than or equal to 45%, furthermore, it is possible to make the Tds less than or equal to 40%, and furthermore, it is possible to make the Tds less than or equal to 39%.

The whole layer composed of the first laminated glass member and the first resin layer transmits a relatively large quantity of infrared rays. Furthermore, most of the infrared rays transmitted through the first laminated glass member and the first resin layer reach the infrared ray reflection layer. Infrared rays which have reached the infrared ray reflection layer are reflected by the infrared ray reflection layer. Moreover, because the infrared ray transmittance of the whole layer composed of the first laminated glass member and the first resin layer is high, most of the infrared rays reflected by the infrared ray reflection layer are transmitted through the first resin layer and the first laminated glass member. As a result, arise in the temperature of an interlayer film at the time when infrared rays are made incident into the interlayer film can be suppressed. As such, the heat shielding properties of the interlayer film for laminated glass are enhanced, and furthermore, high visible light transmittance can be maintained over a long period of time since the interlayer film for laminated glass is excellent in light resistance. Moreover, by fitting the laminated glass into an opening part of a building or a vehicle, a rise in the temperature of an inner space of a building or a vehicle can be effectively suppressed.

On the other hand, if the first laminated glass member, the first resin layer and the infrared ray reflection layer transmit a part of infrared rays at all, the transmitted infrared rays reach the second resin layer or the second laminated glass member. Since the infrared ray transmittance of the whole layer composed of the second resin layer and the second laminated glass member is relatively low, the second resin layer and the second laminated glass member effectively cut off the transmission of infrared rays. As such, the quantity of heat rays passing through the laminated glass as a whole can be reduced. This also enables the heat shielding properties of laminated glass to be enhanced, and by fitting the laminated glass into an opening part of a building or a vehicle, a rise in the temperature of an inner space of a building or a vehicle can be effectively suppressed.

Moreover, as a result of allowing the quantity of infrared rays which reach the second resin layer to be reduced, the deterioration of the second resin layer can be suppressed and the light resistance of the laminated glass as a whole is enhanced. As such, high visible light transmittance can be maintained over a long period of time. Furthermore, in the case where the second resin layer contains a heat shielding compound such as heat shielding particles, the deterioration of the heat shielding compound can also be suppressed and high heat shielding properties can be maintained over a long period of time.

It is preferred that the laminated glass according to the present invention be laminated glass which is fitted into an opening part between an outer space and an inner space into which heat rays are made incident from the outer space for a building or a vehicle. In this case, it is preferred that, among the first and second laminated glass members, the first laminated glass member be arranged so as to be positioned at the outer space side.

FIG. 1 shows an example of laminated glass in accordance with one embodiment of the present invention represented as a sectional view.

Laminated glass 11 shown in FIG. 1 is provided with an interlayer film 1 and first and second laminated glass members 21 and 22. The interlayer film 1 is sandwiched between the first and second laminated glass members 21 and 22. The first laminated glass member 21 is layered on a first surface 1a of the interlayer film 1. The second laminated glass member 22 is layered on a second surface 1b opposite to the first surface 1a of the interlayer film 1. The first laminated glass member 21 is layered on an outer surface 3a of a first resin layer 3 in the interlayer film 1. The second laminated glass member 22 is layered on an outer surface 4a of a second resin layer 4 in the interlayer film 1.

Because the infrared ray transmittance of the whole layer composed of the first laminated glass member and the first resin layer is easily allowed to be higher than the infrared ray transmittance of the whole layer composed of the second laminated glass member and the second resin layer, it is preferred that the infrared ray transmittance in the wavelength of 780 to 2100 nm of the first resin layer be higher than the infrared ray transmittance in the wavelength of 780 to 2100 nm of the second resin layer or the infrared ray transmittance in the wavelength of 780 to 2100 nm of the first laminated glass member be higher than the infrared ray transmittance in the wavelength of 780 to 2100 nm of the second laminated glass member. In this case, the infrared ray transmittance of the first resin layer may be higher than the infrared ray transmittance of the second resin layer and the infrared ray transmittance of the first laminated glass member may be higher than the infrared ray transmittance of the second laminated glass member.

From the viewpoint of further effectively enhancing the heat shielding properties, it is preferred that the infrared ray transmittance in the wavelength of 780 to 2100 nm of the first resin layer be higher than the infrared ray transmittance in the wavelength of 780 to 2100 nm of the second resin layer.

From the viewpoint of further effectively enhancing the heat shielding properties, it is preferred that the infrared ray transmittance in the wavelength of 780 to 2100 nm of the first laminated glass member be higher than the infrared ray transmittance in the wavelength of 780 to 2100 nm of the second laminated glass member.

Examples of the first and second laminated glass members include a glass plate and a PET (polyethylene terephthalate) film and the like. As the laminated glass, laminated glass in which an interlayer film is sandwiched between a glass plate and a PET film or the like, as well as laminated glass in which an interlayer film is sandwiched between two glass plates, is included. Laminated glass is a laminate provided with a glass plate, and it is preferred that at least one glass plate be used. It is preferred that each of the first and second laminated glass members be a glass plate or a PET (polyethylene terephthalate) film and the interlayer film include at least one glass plate as the first or second laminated glass member. It is especially preferred that both of the first and second laminated glass members be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, net-reinforced plate glass, wired plate glass, green glass and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth)acrylate plate, and the like.

It is preferred that the first laminated glass member and the second laminated glass member be each a sheet of clear glass or a sheet of heat ray-absorbing plate glass. Because the infrared ray transmittance is enhanced and the heat shielding properties of laminated glass are further enhanced, it is preferred that the first laminated glass member be a sheet of clear glass. Because the infrared ray transmittance is lowered and the heat shielding properties of laminated glass are further enhanced, it is preferred that the second laminated glass member be a sheet of heat ray-absorbing plate glass. It is preferred that the heat ray-absorbing plate glass be green glass. It is preferred that the first laminated glass member be a sheet of clear glass and the second laminated glass member be a sheet of heat ray-absorbing plate glass. The heat ray-absorbing plate glass is heat ray-absorbing plate glass in accordance with JIS R3208.

Although the thickness of the first or second laminated glass member is not particularly limited, the thickness is preferably greater than or equal to 1 mm and preferably less than or equal to 5 mm. In the case where the laminated glass member is a glass plate, the thickness of the glass plate is preferably greater than or equal to 1 mm and preferably less than or equal to 5 mm. In the case where the laminated glass member is a PET film, the thickness of the PET film is preferably greater than or equal to 0.03 mm and preferably less than or equal to 0.5 mm.

The production method of the laminated glass is not particularly limited. For example, the interlayer film mentioned above is sandwiched between the first and second laminated glass members, and the air remaining between the first or second laminated glass member and the interlayer film is removed by allowing the members to pass through a pressing roll or by putting the members into a rubber bag and allowing the contents to be sucked under reduced pressure. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained.

The laminated glass can be used for automobiles, railway vehicles, aircraft, ships, buildings and the like. It is preferred that the laminated glass be laminated glass for building or for vehicles, and it is more preferred that the laminated glass be laminated glass for vehicles. The laminated glass can also be used for applications other than these applications. The laminated glass can be used for a windshield, side glass, rear glass or roof glass of an automobile and the like. Since the laminated glass is high in heat shielding properties and high in visible light transmittance, the laminated glass is suitably used for automobiles.

From the viewpoint of obtaining laminated glass further excellent in transparency, the visible light transmittance of laminated glass is preferably higher than or equal to 60%, more preferably higher than or equal to 65% and further preferably higher than or equal to 70%. The visible light transmittance of laminated glass can be measured in accordance with JIS R3211 (1998).

From the viewpoint of obtaining laminated glass further excellent in heat shielding properties, the Tts of laminated glass is preferably lower than or equal to 60%, more preferably lower than or equal to 55%, further preferably lower than or equal to 53%, especially preferably lower than or equal to 51% and most preferably lower than or equal to 50%. The Tts is measured in accordance with ISO 13837.

From the viewpoint of obtaining laminated glass further excellent in heat shielding properties, the Tds of laminated glass is preferably lower than or equal to 50%, more preferably lower than or equal to 45%, further preferably lower than or equal to 43%, especially preferably lower than or equal to 41% and most preferably lower than or equal to 39%. The Tds is measured in accordance with ISO 13837.

The infrared ray transmittance (Tir) is determined by measuring a value of infrared ray transmittance and normalizing the value with weighting factors described in JIS Z8722 and JIS R3106.

The infrared ray transmittance T1 in the wavelength of 780 to 2100 nm of the whole layer composed of a first laminated glass member and a first resin layer is measured in the following manner.

Laminated glass in which a first laminated glass member, a first resin layer and a sheet of clear glass (2.5 mm in thickness) are layered in this order is prepared. Weighting factors in the range of 780 to 2100 nm among weighting factors in the range of 300 to 2100 nm shown in Appendix Table 2 in JIS R3106 (1998) are used, and each of weighting factors in the range of 780 to 2100 nm is divided by the total value of weighting factors in the range of 780 to 2100 nm to obtain a newly normalized weighting factor of the infrared ray transmittance in the range of 780 to 2100 nm. Then, the spectral transmittance in the wavelength of 780 to 2100 nm of a sheet of laminated glass is obtained in accordance with JIS R3106 (1998) using a spectrophotometer ("U-4100" available from Hitachi High-Technologies Corporation). The spectral transmittance obtained is multiplied by the newly normalized weighting factor to calculate the infrared ray transmittance T1 in the wavelength of 780 to 2100 nm.

The infrared ray transmittance T2 in the wavelength of 780 to 2100 nm of the whole layer composed of a second laminated glass member and a second resin layer is measured in the following manner.

Laminated glass in which a second laminated glass member, a second resin layer and a sheet of clear glass (2.5 mm in thickness) are layered in this order is prepared. Weighting factors in the range of 780 to 2100 nm among weighting factors in the range of 300 to 2100 nm shown in Appendix Table 2 in JIS R3106 (1998) are used, and each of weighting factors in the range of 780 to 2100 nm is divided by the total value of weighting factors in the range of 780 to 2100 nm to obtain a newly normalized weighting factor of the infrared ray transmittance in the range of 780 to 2100 nm. Then, the spectral transmittance in the wavelength of 780 to 2100 nm of a sheet of laminated glass is obtained in accordance with JIS R3106 (1998) using a spectrophotometer ("U-4100" available from Hitachi High-Technologies Corporation). The spectral transmittance obtained is multiplied by the newly normalized weighting factor to calculate the infrared ray transmittance T2 in the wavelength of 780 to 2100 nm.

Moreover, specifically, the infrared ray transmittance in the wavelength of 780 to 2100 nm of the first resin layer, the second resin layer or the like is measured in the following manner.

A first resin layer or a second resin layer (an object to be measured for the infrared ray transmittance) and the like are interposed between two sheets of clear glass to prepare laminated glass. Weighting factors in the range of 780 to 2100 nm among weighting factors in the range of 300 to 2100 nm shown in Appendix Table 2 in JIS R3106 (1998) are used, and each of weighting factors in the range of 780 to 2100 nm is divided by the total value of weighting factors in the range of 780 to 2100 nm to obtain a newly normalized weighting factor of the infrared ray transmittance in the range of 780 to 2100 nm. Then, the spectral transmittance in the wavelength of 780 to 2100 nm of a sheet of laminated glass is obtained in accordance with JIS R3106 (1998) using a spectrophotometer ("U-4100" available from Hitachi High-Technologies Corporation). The spectral transmittance obtained is multiplied by the newly normalized weighting factor to calculate the infrared ray transmittance in the wavelength of 780 to 2100 nm.

The haze value of laminated glass is preferably lower than or equal to 2%, more preferably lower than or equal to 1%, further preferably lower than or equal to 0.5% and especially preferably lower than or equal to 0.4%. The haze value of laminated glass can be measured in accordance with JIS K6714.

(Method for Fitting Laminated Glass)

The method for fitting laminated glass according to the present invention is a method for fitting the above-described laminated glass for a building or a vehicle into an opening part between an outer space and an inner space into which heat rays are made incident from the outer space.

Specifically, the laminated glass is fitted into an opening part so that the first laminated glass member is positioned at the outer space side and the second laminated glass member is positioned at the inner space side. That is, the laminated glass is fitted so that an arrangement order of the outer space/a first laminated glass member/(another layer/)a first resin layer/(another layer/)an infrared ray reflection layer/(another layer/)a second resin layer/(another layer/)a second laminated glass member/the inner space is attained. Preferably, it is preferred that an arrangement order of the outer space/a first laminated glass member/a first resin layer/(another layer/)an infrared ray reflection layer/(another layer/)a second resin layer/a second laminated glass member/the inner space be attained, it is preferred that an arrangement order of the outer space/a first laminated glass member/(another layer/)a first resin layer/an infrared ray reflection layer/a second resin layer/(another layer/)a second laminated glass member/the inner space be attained, and it is preferred that an arrangement order of the outer space/a first laminated glass member/a first resin layer/an infrared ray reflection layer/a second resin layer/a second laminated glass member/the inner space be attained. In the above-mentioned arrangement forms, the case where another member is arranged between the outer space and the first laminated glass member is included, and the case where another member is arranged between the inner space and the second laminated glass member is included.

In the layered structure, each of another layer mentioned above and another member mentioned above may be present or may be absent. Sunlight containing heat rays is made incident into laminated glass from an outer space, and the sunlight containing heat rays, which has passed through the laminated glass, is led to an inner space. In the case where laminated glass is fitted into an opening part as mentioned above, the outer surface of the first laminated glass member constitutes the incident face for heat rays. Moreover, heat rays are made incident into the first resin layer earlier than the second resin layer.

Hereinafter, the present invention will be described in more detail with reference to examples. The present invention is not limited only to the following examples.

The following materials were used to form first and second resin layers.

Thermoplastic Resin:

Polyvinyl butyral resins PVB1 to PVB7 (any of these is a polyvinyl butyral resin (PVB) acetalized with n-butyraldehyde) shown in the following Table 1 were prepared.

TABLE 1

| Kind of thermoplastic resin | Average polymerization degree | Content ratio of hydroxyl group (mol %) | Acetylation degree (mol %) | Butyralization degree (mol %) |
|---|---|---|---|---|
| PVB1 | 1700 | 30.5 | 1 | 68.5 |
| PVB2 | 1700 | 19 | 20 | 61 |
| PVB3 | 1700 | 16.5 | 0.5 | 83 |
| PVB4 | 1700 | 38.5 | 1 | 60.5 |
| PVB5 | 3000 | 22 | 13 | 65 |
| PVB6 | 3000 | 19 | 20 | 61 |
| PVB7 | 3000 | 16.5 | 0.5 | 83 |

Plasticizer:
3GO (triethylene glycol di-2-ethylhexanoate)
Other Ingredients:
BHT (an oxidation inhibitor, 2,6-di-t-butyl-p-cresol)
T-460 (2,4-bis[2-hydroxy-4-butoxyphenyl]-6-(2,4-dibutoxyphenyl) 1,3,5-triazine, "Tinuvin 460" available from BASF Japan Ltd.)
T-326 (an ultraviolet ray shielding agent, 2-(2'-hydroxy-3'-t-butyl-5-methylphenyl)-5-chlorobenzotriazole, "Tinuvin 326" available from BASF Japan Ltd.)
LAF70 (an ultraviolet ray shielding agent, a triazine-based ultraviolet ray shielding agent, "LA-F70" available from ADEKA CORPORATION)
VSU (an ultraviolet ray shielding agent, 2-ethyl-2'-ethoxy-oxyanilide, "Sanduvor VSU" available from Clariant Japan K.K.)
PR25 (an ultraviolet ray shielding agent, malonic acid[(4-methoxyphenyl)-methylene]-dimethyl ester, "Hostavin PR-25" available from Clariant Japan K.K.)
ITO (ITO particles, tin-doped indium oxide particles)
CWO (CWO particles, cesium-doped tungsten oxide ($Cs_{0.33}WO_3$) particles)
43V (Ingredient X, a phthalocyanine compound, "NIR-43V" available from YAMADA CHEMICAL CO., LTD. which contains a vanadium atom as the central metal)
SG-5A1257 (Ingredient X, a phthalocyanine compound which contains a copper atom, "BLUE SG-5A1257" available from SUMIKA COLOR CO., LTD.)
A metal salt (an adhesive force regulating agent, magnesium acetate tetrahydrate)
Moreover, the following infrared ray reflection layers were prepared.
XIR-75 (a resin film with metal foil, "XIR-75" available from Southwall Technologies Inc.)
A multilayer film (3M, a multilayer resin film, "Multilayer Nano 80S" available from 3M Japan Limited)
Moreover, the following laminated glass members (sheets of glass) were prepared.
Clear glass (100 cm in longitudinal length by 100 cm in transversal length by 2 mm in thickness)
Green glass (heat ray-absorbing plate glass in accordance with JIS R3208, 100 cm in longitudinal length by 100 cm in transversal length by 2 mm in thickness)
(Preparation of Resin Layer A1)
To 100 parts by weight of a polyvinyl butyral resin (PVB1), 40 parts by weight of a plasticizer (3GO), 0.8 part by weight of an ultraviolet ray shielding agent (T-326), 0.2 part by weight of an oxidation inhibitor (BHT) and magnesium acetate tetrahydrate in an amount that the metal element concentration becomes 45.6 ppm in the resulting resin layer A1 were added and thoroughly kneaded with a mixing roll to obtain a composition.

The composition obtained was extruded by an extruder to obtain a single-layered resin layer A1 with a thickness of 380 µm.
(Preparation of Resin Layers A2 to A10)
Single-layered resin layers A2 to A10 with a thickness of 380 µm were obtained in the same manner as that for the resin layer A1 except that the kind of ingredients to be blended and the blending amount thereof were set to those listed in the following Table 2.

TABLE 2

| Kind of first resin layer | Composition of first resin layer | | | | |
|---|---|---|---|---|---|
| | PVB | 3GO | T-326 | BHT | Metal salt |
| | Kind | Parts by weight | Parts by weight | Parts by weight | Parts by weight | ppm |
| A1 | PVB1 | 100 | 40 | 0.8 | 0.2 | 45.6 |
| A2 | PVB1 | 100 | 36 | 0.2 | 0.2 | 45.6 |
| A3 | PVB1 | 100 | 36 | 0.8 | 0.2 | 45.6 |
| A4 | PVB1 | 100 | 40 | 0.2 | 0.2 | 45.6 |
| A5 | PVB2 | 100 | 36 | 0.8 | 0.2 | 45.6 |
| A6 | PVB3 | 100 | 36 | 0.8 | 0.2 | 45.6 |
| A7 | PVB4 | 100 | 36 | 0.8 | 0.2 | 45.6 |
| A8 | PVB1 | 100 | 36 | 0.2 | 0.2 | 25.6 |
| A9 | PVB1 | 100 | 36 | 0.2 | 0.2 | 65.6 |
| A10 | PVB1 | 100 | 36 | 0.2 | 0.2 | — |

(Preparation of Resin Layer B1)
To 40 parts by weight of a plasticizer (3GO), ITO in an amount that the content thereof in the resulting resin layer B1 becomes 0.39% by weight was added and the mixture was thoroughly kneaded to obtain a plasticizer dispersion. To 100 parts by weight of a polyvinyl butyral resin (PVB1), the whole amount of the plasticizer dispersion, 0.2 part by weight of an oxidation inhibitor (BHT) and magnesium acetate tetrahydrate in an amount that the metal element concentration becomes 94.3 ppm in the resulting resin layer B1 were added and thoroughly kneaded with a mixing roll to obtain a composition.
The composition obtained was extruded by an extruder to obtain a single-layered resin layer B1 with a thickness of 380
(Preparation of Resin Layers B2 to B28)
Single-layered resin layers B2 to B28 with a thickness of 380 µm were prepared in the same manner as that for the resin layer B1 except that the kind of ingredients to be blended and the content thereof were set to those listed in the following Table 3.
In this connection, in the foregoing Table 2 and the following Table 3, the amounts of PVB1, 3GO, BHT, T-326, T-460, LAF70, VSU and PR25 blended refer to the blending amounts thereof (parts by weight) relative to 100 parts by weight of the polyvinyl butyral resin (PVB). The amounts of ITO, CWO, 43V and SG-5A1257 blended refer to the blending amounts thereof (% by weight) in 100% by weight of the resin layer. The amount of a metal salt blended refers to the metal element concentration in the resin layer.

TABLE 3

| Kind of second resin layer | PVB1 Parts by weight | 3GO Parts by weight | BHT Parts by weight | T-326 Parts by weight | T-460 Parts by weight | LAF70 Parts by weight | VSU Parts by weight | PR25 Parts by weight | ITO % by weight | CWO % by weight | 43V % by weight | SG-5A1257 % by weight | Metal salt ppm |
|---|---|---|---|---|---|---|---|---|---|---|---|---|---|
| B1  | 100 | 40 | 0.2 | —   | —    | —    | —   | —   | 0.39  | —     | —     | —      | 94.3  |
| B2  | 100 | 40 | 0.2 | —   | —    | —    | —   | —   | 1.4   | —     | —     | —      | 94.3  |
| B3  | 100 | 40 | 0.2 | —   | 0.6  | —    | 0.4 | 0.4 | 0.8   | —     | 0.008 | —      | 94.3  |
| B4  | 100 | 40 | 0.2 | —   | —    | 0.25 | 0.4 | 0.4 | 0.24  | 0.048 | 0.012 | —      | 94.3  |
| B5  | 100 | 40 | 0.2 | 0.8 | —    | —    | —   | —   | 0.4   | —     | 0.008 | —      | 94.3  |
| B6  | 100 | 40 | 0.2 | 0.8 | —    | —    | —   | —   | 0.2   | —     | —     | —      | 94.3  |
| B7  | 100 | 40 | 0.2 | 0.8 | —    | —    | —   | —   | 0.8   | 0.1   | 0.006 | —      | 94.3  |
| B8  | 100 | 40 | 0.2 | 0.8 | —    | —    | —   | —   | 0.8   | —     | 0.012 | —      | 94.3  |
| B9  | 100 | 36 | 0.4 | 0.8 | —    | —    | —   | —   | 0.8   | —     | 0.009 | —      | 94.3  |
| B10 | 100 | 36 | 0.4 | 0.8 | —    | —    | —   | —   | 1.2   | —     | 0.009 | —      | 94.3  |
| B11 | 100 | 36 | 0.4 | 0.8 | —    | —    | —   | —   | 0.7   | —     | 0.007 | —      | 94.3  |
| B12 | 100 | 36 | 0.4 | 0.8 | —    | —    | —   | —   | 1.3   | —     | 0.014 | —      | 94.3  |
| B13 | 100 | 36 | 0.4 | 0.8 | —    | —    | —   | —   | 1.7   | —     | 0.018 | —      | 94.3  |
| B14 | 100 | 36 | 0.4 | 0.8 | —    | —    | —   | —   | 1.1   | —     | 0.012 | 0.0013 | 94.3  |
| B15 | 100 | 36 | 0.4 | 0.8 | —    | —    | —   | —   | 1.3   | —     | 0.014 | 0.001  | 94.3  |
| B16 | 100 | 40 | 0.2 | 0.2 | —    | —    | —   | —   | 0.39  | —     | —     | —      | 94.3  |
| B17 | 100 | 40 | 0.2 | 0.4 | —    | —    | —   | —   | 1.4   | —     | —     | —      | 94.3  |
| B18 | 100 | 36 | 0.4 | 0.8 | —    | —    | —   | —   | 0.8   | —     | 0.009 | —      | 74.3  |
| B19 | 100 | 36 | 0.4 | 0.8 | —    | —    | —   | —   | 0.8   | —     | 0.009 | —      | 114.3 |
| B20 | 100 | 36 | 0.4 | 0.8 | —    | —    | —   | —   | 0.8   | —     | 0.009 | —      | —     |
| B21 | 100 | 36 | 0.2 | 0.8 | —    | —    | —   | —   | 0.833 | —     | 0.009 | —      | 94.3  |
| B22 | 100 | 36 | 0.2 | 0.8 | —    | —    | —   | —   | 0.66  | 0.01  | 0.009 | —      | 94.3  |
| B23 | 100 | 36 | 0.2 | 0.8 | —    | —    | —   | —   | 0.52  | 0.02  | 0.009 | —      | 94.3  |
| B24 | 100 | 36 | 0.2 | 0.8 | —    | —    | —   | —   | 0.28  | 0.04  | 0.009 | —      | 94.3  |
| B25 | 100 | 36 | 0.2 | 0.8 | —    | —    | —   | —   | 0.72  | —     | 0.001 | —      | 94.3  |
| B26 | 100 | 36 | 0.2 | 0.8 | —    | —    | —   | —   | 0.22  | 0.04  | 0.001 | —      | 94.3  |
| B27 | 100 | 36 | 0.2 | 0.8 | —    | —    | —   | —   | 0.64  | —     | 0.011 | —      | 94.3  |
| B28 | 100 | 36 | 0.2 | 0.8 | —    | —    | —   | —   | 0.2   | 0.04  | 0.011 | —      | 94.3  |

Example 1

(1) Preparation of Interlayer Film for Laminated Glass

As an infrared ray reflection layer, XIR-75 (a resin film with metal foil, "XIR-75" available from Southwall Technologies Inc.) was prepared.

The XIR-75 prepared was used as an infrared ray reflection layer and the infrared ray reflection layer was sandwiched between a resin layer A1 obtained and a resin layer B3 obtained to obtain an interlayer film.

(2) Preparation of Laminated Glass

The interlayer film obtained was cut into a size of 30 cm in longitudinal length by 30 cm in transversal length. Moreover, one sheet of clear glass (30 cm in longitudinal length by 30 cm in transversal length by 2 mm in thickness) and one sheet of green glass (heat ray-absorbing plate glass in accordance with JIS R3208, 30 cm in longitudinal length by 30 cm in transversal length by 2 mm in thickness) were prepared. The interlayer film obtained was sandwiched between the sheet of clear glass and the sheet of green glass, held in place for 30 minutes at 90° C. and pressed under vacuum with a vacuum laminator to obtain a laminate. With regard to the laminate, interlayer film portions protruded from the glass plate were cut away to obtain a sheet of laminated glass.

Examples 2 to 44

Interlayer films and sheets of laminated glass were prepared in the same manner as that in Example 1 except that the kind of first and second resin layers, the kind of an infrared ray reflection layer and the kind of first and second laminated glass members (glass) were set to those listed in the following Table 4.

Comparative Example 1

Without using an infrared ray reflection layer, a resin layer A1 obtained and a resin layer A1 obtained were layered to obtain an interlayer film. A sheet of laminated glass was obtained in the same manner as that in Example 1 except that the interlayer film obtained was used.

Comparative Example 2

The same infrared ray reflection layer as that in Example 1 was sandwiched between a resin layer A1 obtained and a resin layer A1 obtained to obtain an interlayer film. A sheet of laminated glass was obtained in the same manner as that in Example 1 except that the interlayer film obtained was used and a sheet of clear glass was used as the second laminated glass member.

Comparative Example 3

As an infrared ray reflection layer, a multilayer film (3M, a multilayer resin film, "Multilayer Nano 80S" available from 3M Japan Limited) was prepared.

The multilayer film prepared was used alone as an infrared ray reflection layer and the infrared ray reflection layer was sandwiched between a resin layer A1 obtained and a resin layer A1 obtained to obtain an interlayer film. A sheet of laminated glass was obtained in the same manner as that in Example 1 except that the interlayer film obtained was used and a sheet of clear glass was used as the second laminated glass member.

Comparative Example 4

As an infrared ray reflection layer, a multilayer film (3M, a multilayer resin film, "Multilayer Nano 80S" available from 3M Japan Limited) was prepared.

The multilayer film prepared was used alone as an infrared ray reflection layer and the infrared ray reflection layer was sandwiched between a resin layer A1 obtained and a resin layer A1 obtained to obtain an interlayer film. A sheet of laminated glass was obtained in the same manner as that in Example 1 except that the interlayer film obtained was used and the first laminated glass member was changed to a sheet of green glass.

(Evaluation)

(1) Measurement of Visible Light Transmittance (A Light Y Value, A-Y (380 to 780 nm))

The laminated glass obtained was measured for the visible light transmittance in the wavelength of 380 to 780 nm in accordance with JIS R3211 (1998) using a spectrophotometer ("U-4100" available from Hitachi High-Technologies Corporation)

(2) Measurement of Tds (Direct Solar Energy Transmitted Through a Glazing)

The laminated glass obtained was measured for the Tds in the wavelength of 300 to 2500 nm in accordance with ISO 13837 using a spectrophotometer ("U-4100" available from Hitachi High-Technologies Corporation).

(3) Measurement of Tts (Total Solar Energy Transmitted Through a Glazing)

The transmittance/reflectance in the wavelength of 300 to 2500 nm was measured using a spectrophotometer ("U-4100" available from Hitachi High-Technologies Corporation) in accordance with ISO 13837 to calculate the Tts.

(4) Penetration Resistance

The surface temperature of the sheet of laminated glass (30 cm in longitudinal length by 30 cm in transversal length) obtained was adjusted to 23° C. Then, in accordance with JIS R3212, a hard sphere with a mass of 2260 g and a diameter of 82 mm was dropped at the center part of each of six sheets of laminated glass from a height of 5 m. In the case where the hard sphere does not penetrate through each of all the six sheets of laminated glass within 5 seconds after the hard sphere has collided therewith, the laminated glass is acceptable (Circle). In the case where sheets of laminated glass through each of which the hard sphere does not penetrate within 5 seconds after the hard sphere has collided therewith are three or less sheets, the laminated glass is not acceptable (X mark). In the case where sheets of laminated glass through each of which the hard sphere does not penetrate are four sheets, separately, six sheets of laminated glass are evaluated for the penetration resistance. In the case where sheets of laminated glass through each of which the hard sphere does not penetrate are five sheets, separately, one sheet of laminated glass is additionally tested. In the case where the hard sphere does not penetrate through the sheet of laminated glass within 5 seconds after the hard sphere has collided therewith, the laminated glass is acceptable. In the same manner, a hard sphere with a mass of 2260 g and a diameter of 82 mm was dropped at the center part of each of six sheets of laminated glass from a height of 5 m, 6 m or 7 m to evaluate the penetration resistance of laminated glass. In this connection, with regard to Examples 35 and 36 in which a resin layer containing no metal salt is used, as compared with other examples, there is a tendency that the size of glass fragments becomes large.

The layered configuration of laminated glass and evaluation results are shown in the following Tables 4 and 5.

Moreover, when the infrared ray transmittance in the wavelength of 780 to 2100 nm of the whole layer composed of a first laminated glass member and a first resin layer is defined as T1 and the infrared ray transmittance in the wavelength of 780 to 2100 nm of the whole layer composed of a second laminated glass member and a second resin layer is defined as T2, the relationship between T1 and T2 is described in the column of "The whole layer composed of laminated glass member and resin layer" of the infrared ray transmittance of the following Table 5. When the infrared ray transmittance in the wavelength of 780 to 2100 nm of the first resin layer is defined as Tx1 and the infrared ray transmittance in the wavelength of 780 to 2100 nm of the second resin layer is defined as Tx2, the relationship between Tx1 and Tx2 is described in the column of "Resin layer" of the infrared ray transmittance of the following Table 5. When the infrared ray transmittance in the wavelength of 780 to 2100 nm of the first laminated glass member is defined as Ty1 and the infrared ray transmittance in the wavelength of 780 to 2100 nm of the second laminated glass member is defined as Ty2, the relationship between Ty1 and Ty2 is described in the column of "Laminated glass member" of the infrared ray transmittance of the following Table 5.

In this connection, the infrared ray transmittance T1 in the wavelength of 780 to 2100 nm of the whole layer composed of a first laminated glass member and a first resin layer was measured in the following manner. Laminated glass in which a first laminated glass member, a first resin layer and a sheet of clear glass (2.5 mm in thickness) are layered in this order was prepared. Weighting factors in the range of 780 to 2100 nm shown in Appendix Table 2 in JIS R3106 (1998) were used and normalized as new weighting factors for the infrared ray transmittance. Then, the spectral transmittance in the wavelength of 780 to 2100 nm of a sheet of laminated glass was obtained in accordance with JIS R3106 (1998) using a spectrophotometer ("U-4100" available from Hitachi High-Technologies Corporation). By multiplying the spectral transmittance obtained by the newly normalized weighting factors, the infrared ray transmittance T1 in the wavelength of 780 to 2100 nm was determined as a weighted average to be calculated. Weighting factors in the range of 780 to 2100 nm among weighting factors in the range of 300 to 2100 nm shown in Appendix Table 2 in JIS R3106 (1998) were used, and each of weighting factors in the range of 780 to 2100 nm was divided by the total value of weighting factors in the range of 780 to 2100 nm to obtain a newly normalized weighting factor of the infrared ray transmittance in the range of 780 to 2100 nm. Then, the spectral transmittance in the wavelength of 780 to 2100 nm of a sheet of laminated glass was obtained in accordance with JIS R3106 (1998) using a spectrophotometer ("U-4100" available from Hitachi High-Technologies Corporation). The spectral transmittance obtained was multiplied by the newly normalized weighting factor to calculate the infrared ray transmittance T1 in the wavelength of 780 to 2100 nm.

The infrared ray transmittance T2 in the wavelength of 780 to 2100 nm of the whole layer composed of a second laminated glass member and a second resin layer was measured in the following manner. Laminated glass in which a second laminated glass member, a second resin layer and a sheet of clear glass (2.5 mm in thickness) are layered in this order was prepared. Weighting factors in the range of 780 to 2100 nm shown in Appendix Table 2 in JIS R3106 (1998) were used and normalized as new weighting factors for the infrared ray transmittance. Then, the spectral transmittance in the wavelength of 780 to 2100 nm of a sheet of laminated glass was obtained in accordance with JIS R3106 (1998) using a spectrophotometer ("U-4100" available from Hitachi High-Technologies Corporation). By multiplying the spectral transmittance obtained by the newly normalized weighting factors, the infrared ray transmittance T2 in the wavelength of 780 to 2100 nm was determined as a weighted average to be calculated. Weighting factors in the range of 780 to 2100 nm among weighting factors in the range of 300 to 2100 nm shown in Appendix Table 2 in JIS R3106 (1998) were used, and each of weighting factors in the range of 780 to 2100 nm was divided by the total value of weighting factors in the range of 780 to 2100 nm to obtain a newly normalized weighting factor of the infrared ray transmittance in the range of 780 to 2100 nm. Then, the spectral transmittance in the wavelength of 780 to 2100 nm of a sheet of laminated glass was obtained in accordance with JIS R3106 (1998) using a spectrophotometer ("U-4100" available from Hitachi High-Technologies Corporation). The spectral transmittance obtained was multiplied by the newly normalized weighting factor to calculate the infrared ray transmittance T1 in the wavelength of 780 to 2100 nm.

Moreover, the infrared ray transmittance Tx1 or Tx2 in the wavelength of 780 to 2100 nm of a first resin layer or a second resin layer was measured in the following manner. A first resin layer or a second resin layer was interposed between two sheets of clear glass (2.5 mm in thickness) to prepare laminated glass. Weighting factors in the range of 780 to 2100 nm shown in Appendix Table 2 in JIS R3106 (1998) were used and normalized as new weighting factors for the infrared ray transmittance. Then, the spectral transmittance in the wavelength of 780 to 2100 nm of a sheet of laminated glass was obtained in accordance with JIS R3106 (1998) using a spectrophotometer ("U-4100" available from Hitachi High-Technologies Corporation). By multiplying the spectral transmittance obtained by the newly normalized weighting factors, the infrared ray transmittance in the wavelength of 780 to 2100 nm was determined as a weighted average to be calculated. Weighting factors in the range of 780 to 2100 nm among weighting factors in the range of 300 to 2100 nm shown in Appendix Table 2 in JIS R3106 (1998) were used, and each of weighting factors in the range of 780 to 2100 nm was divided by the total value of weighting factors in the range of 780 to 2100 nm to obtain a newly normalized weighting factor of the infrared ray transmittance in the range of 780 to 2100 nm. Then, the spectral transmittance in the wavelength of 780 to 2100 nm of a sheet of laminated glass was obtained in accordance with JIS R3106 (1998) using a spectrophotometer ("U-4100" available from Hitachi High-Technologies Corporation). The spectral transmittance obtained was multiplied by the newly normalized weighting factor to calculate the infrared ray transmittance Tx1 or Tx2 in the wavelength of 780 to 2100 nm.

TABLE 4

| | Layered configuration | | | | | Evaluation | | | |
|---|---|---|---|---|---|---|---|---|---|
| | First laminated glass member | First resin layer | Infrared ray reflection layer | Second resin layer | Second laminated glass member | A-Y (%) | Tds (%) | Tts (%) | Penetration resistance |
| Ex. 1 | Clear | A1 | XIR-75 | B3 | Green | 66.8 | 34.2 | 45.5 | ○ |
| Ex. 2 | Clear | A1 | XIR-75 | B2 | Green | 66.7 | 35.8 | 46.7 | ○ |
| Ex. 3 | Clear | A1 | XIR-75 | B1 | Clear | 74.3 | 45.1 | 53.4 | ○ |
| Ex. 4 | Green | A1 | XIR-75 | B1 | Green | 71.4 | 39.3 | 49.2 | ○ |
| Ex. 5 | Green | A1 | Multilayer film | B2 | Green | 72.8 | 37.3 | 51.2 | ○ |
| Ex. 6 | Clear | A1 | Multilayer film | B2 | Green | 76.9 | 41.9 | 52.3 | ○ |
| Ex. 7 | Green | A1 | Multilayer film | B4 | Green | 71.3 | 34.1 | 48.9 | ○ |
| Ex. 8 | Clear | A1 | Multilayer film | B4 | Green | 75.2 | 38.3 | 49.7 | ○ |
| Ex. 9 | Clear | A1 | Multilayer film | B4 | Clear | 79.6 | 43.5 | 53.5 | ○ |
| Ex. 10 | Green | A1 | Multilayer film | B3 | Green | 72.9 | 35.7 | 50.0 | ○ |
| Ex. 11 | Clear | A1 | Multilayer film | B3 | Green | 77.0 | 40.1 | 51.0 | ○ |
| Ex. 12 | Green | A1 | Multilayer film | B1 | Green | 75.8 | 41.1 | 54.0 | ○ |
| Ex. 13 | Clear | A2 | Multilayer film | B9 | Green | 77.7 | 39.7 | 50.7 | ○ |
| Ex. 14 | Clear | A3 | Multilayer film | B9 | Green | 77.7 | 40.0 | 50.5 | ○ |
| Ex. 15 | Clear | A4 | Multilayer film | B9 | Green | 77.8 | 40.2 | 50.8 | ○ |
| Ex. 16 | Clear | A5 | Multilayer film | B9 | Green | 77.9 | 40.3 | 50.7 | ○ |
| Ex. 17 | Clear | A6 | Multilayer film | B9 | Green | 77.8 | 40.2 | 50.8 | ○ |
| Ex. 18 | Clear | A7 | Multilayer film | B9 | Green | 77.8 | 40.2 | 50.8 | ○ |
| Ex. 19 | Clear | A5 | Multilayer film | B10 | Green | 75.4 | 36.7 | 48.2 | ○ |
| Ex. 20 | Clear | A2 | Multilayer film | B11 | Green | 79.2 | 41.0 | 51.7 | ○ |
| Ex. 21 | Clear | A2 | Multilayer film | B12 | Green | 76.7 | 37.7 | 49.2 | ○ |
| Ex. 22 | Clear | A2 | Multilayer film | B13 | Green | 73.7 | 34.2 | 46.6 | ○ |
| Ex. 23 | Clear | A3 | Multilayer film | B14 | Green | 73.2 | 35.9 | 47.5 | ○ |
| Ex. 24 | Clear | A3 | Multilayer film | B15 | Green | 72.8 | 34.8 | 46.7 | ○ |
| Ex. 25 | Clear | A1 | XIR-75 | B17 | Green | 66.7 | 35.8 | 46.7 | ○ |
| Ex. 26 | Clear | A1 | XIR-75 | B16 | Clear | 74.3 | 45.1 | 53.4 | ○ |
| Ex. 27 | Green | A1 | XIR-75 | B16 | Green | 71.4 | 39.3 | 49.2 | ○ |
| Ex. 28 | Green | A1 | Multilayer film | B17 | Green | 72.8 | 37.3 | 51.2 | ○ |
| Ex. 29 | Clear | A1 | Multilayer film | B17 | Green | 76.9 | 41.9 | 52.3 | ○ |
| Ex. 30 | Green | A1 | Multilayer film | B16 | Green | 75.8 | 41.1 | 54.0 | ○ |
| Ex. 31 | Clear | A8 | Multilayer film | B9 | Green | 77.7 | 39.7 | 50.7 | ○ |
| Ex. 32 | Clear | A9 | Multilayer film | B9 | Green | 77.7 | 39.7 | 50.7 | ○ |
| Ex. 33 | Clear | A2 | Multilayer film | B18 | Green | 77.7 | 39.7 | 50.7 | ○ |
| Ex. 34 | Clear | A2 | Multilayer film | B19 | Green | 77.7 | 39.7 | 50.7 | ○ |
| Ex. 35 | Clear | A10 | Multilayer film | B9 | Green | 77.7 | 39.7 | 50.7 | ○ |
| Ex. 36 | Clear | A2 | Multilayer film | B20 | Green | 77.7 | 39.7 | 50.7 | ○ |
| Ex. 37 | Clear | A2 | Multilayer film | B21 | Green | 76.9 | 39.1 | 50.3 | ○ |
| Ex. 38 | Clear | A2 | Multilayer film | B22 | Green | 76.8 | 39.2 | 50.3 | ○ |
| Ex. 39 | Clear | A2 | Multilayer film | B23 | Green | 76.6 | 39.1 | 50.3 | ○ |

TABLE 4-continued

| | Layered configuration | | | | | Evaluation | | | |
|---|---|---|---|---|---|---|---|---|---|
| | First laminated glass member | First resin layer | Infrared ray reflection layer | Second resin layer | Second laminated glass member | A-Y (%) | Tds (%) | Tts (%) | Penetration resistance |
| Ex. 40 | Clear | A2 | Multilayer film B24 | A2 | Green | 76.2 | 39.1 | 50.3 | ○ |
| Ex. 41 | Clear | A2 | Multilayer film B25 | A2 | Green | 77.0 | 39.2 | 50.3 | ○ |
| Ex. 42 | Clear | A2 | Multilayer film B26 | A2 | Green | 76.1 | 39.2 | 50.4 | ○ |
| Ex. 43 | Clear | A2 | Multilayer film B27 | A2 | Green | 76.9 | 39.1 | 50.3 | ○ |
| Ex. 44 | Clear | A2 | Multilayer film B28 | A2 | Green | 75.9 | 39.0 | 50.2 | ○ |
| Comp. Ex. 1 | Clear | A1 | — | A1 | Green | 83.8 | 62.7 | 71.2 | ○ |
| Comp. Ex. 2 | Clear | A1 | XIR-75 | A1 | Clear | 75.6 | 47.5 | 55.1 | ○ |
| Comp. Ex. 3 | Clear | A1 | Multilayer film | A1 | Clear | 83.1 | 54.5 | 61.6 | ○ |
| Comp. Ex. 4 | Green | A1 | Multilayer film | A1 | Green | 75.6 | 45.7 | 57.0 | ○ |

TABLE 5

| | Infrared ray transmittance | | | | | | | | | |
|---|---|---|---|---|---|---|---|---|---|---|
| | The whole layer composed of laminated glass member and resin layer | | | Resin layer | | | Laminated glass member | | | |
| | | T1 (%) | T2 (%) | T1 − T2 | | Tx1 (%) | Tx2 (%) | Tx1 − Tx2 | | Ty1 (%) | Ty2 (%) | Ty1 − Ty2 |
| Ex. 1 | T1 > T2 | 76.1 | 29.0 | 47.1 | Tx1 > Tx2 | 76.1 | 43.1 | 33.0 | Ty1 > Ty2 | 85.3 | 61.1 | 24.2 |
| Ex. 2 | T1 > T2 | 76.1 | 24.0 | 52.1 | Tx1 > Tx2 | 76.1 | 36.8 | 39.3 | Ty1 > Ty2 | 85.3 | 61.1 | 24.2 |
| Ex. 3 | T1 > T2 | 76.1 | 48.1 | 28.0 | Tx1 > Tx2 | 76.1 | 48.1 | 28.0 | Ty1 = Ty2 | 85.3 | 85.3 | 0.0 |
| Ex. 4 | T1 > T2 | 49.1 | 34.0 | 15.1 | Tx1 > Tx2 | 76.1 | 48.1 | 28.0 | Ty1 = Ty2 | 61.1 | 61.1 | 0.0 |
| Ex. 5 | T1 > T2 | 49.1 | 24.0 | 25.1 | Tx1 > Tx2 | 76.1 | 36.8 | 39.3 | Ty1 = Ty2 | 61.1 | 61.1 | 0.0 |
| Ex. 6 | T1 > T2 | 76.1 | 24.0 | 52.1 | Tx1 > Tx2 | 76.1 | 36.8 | 39.3 | Ty1 > Ty2 | 85.3 | 61.1 | 24.2 |
| Ex. 7 | T1 > T2 | 49.1 | 28.9 | 20.2 | Tx1 > Tx2 | 76.1 | 40.8 | 35.3 | Ty1 = Ty2 | 61.1 | 61.1 | 0.0 |
| Ex. 8 | T1 > T2 | 76.1 | 28.9 | 47.2 | Tx1 > Tx2 | 76.1 | 40.8 | 35.3 | Ty1 > Ty2 | 85.3 | 61.1 | 24.2 |
| Ex. 9 | T1 > T2 | 76.1 | 40.8 | 35.3 | Tx1 > Tx2 | 76.1 | 40.8 | 35.3 | Ty1 = Ty2 | 85.3 | 85.3 | 0.0 |
| Ex. 10 | T1 > T2 | 49.1 | 29.0 | 20.1 | Tx1 > Tx2 | 76.1 | 43.1 | 33.0 | Ty1 = Ty2 | 61.1 | 61.1 | 0.0 |
| Ex. 11 | T1 > T2 | 76.1 | 29.0 | 47.1 | Tx1 > Tx2 | 76.1 | 43.1 | 33.0 | Ty1 > Ty2 | 85.3 | 61.1 | 24.2 |
| Ex. 12 | T1 > T2 | 49.1 | 34.0 | 15.1 | Tx1 > Tx2 | 76.1 | 48.1 | 28.0 | Ty1 = Ty2 | 61.1 | 61.1 | 0.0 |
| Ex. 13 | T1 > T2 | 76.3 | 29.0 | 47.3 | Tx1 > Tx2 | 76.3 | 40.3 | 36.0 | Ty1 > Ty2 | 85.3 | 61.1 | 24.2 |
| Ex. 14 | T1 > T2 | 75.9 | 29.0 | 46.9 | Tx1 > Tx2 | 75.9 | 40.3 | 35.6 | Ty1 > Ty2 | 85.3 | 61.1 | 24.2 |
| Ex. 15 | T1 > T2 | 76.2 | 29.0 | 47.2 | Tx1 > Tx2 | 76.2 | 40.3 | 35.9 | Ty1 > Ty2 | 85.3 | 61.1 | 24.2 |
| Ex. 16 | T1 > T2 | 75.9 | 29.0 | 46.9 | Tx1 > Tx2 | 75.9 | 40.3 | 35.6 | Ty1 > Ty2 | 85.3 | 61.1 | 24.2 |
| Ex. 17 | T1 > T2 | 75.9 | 29.0 | 46.9 | Tx1 > Tx2 | 75.9 | 40.3 | 35.6 | Ty1 > Ty2 | 85.3 | 61.1 | 24.2 |
| Ex. 18 | T1 > T2 | 75.9 | 29.0 | 46.9 | Tx1 > Tx2 | 75.9 | 40.3 | 35.6 | Ty1 > Ty2 | 85.3 | 61.1 | 24.2 |
| Ex. 19 | T1 > T2 | 75.9 | 25.4 | 50.5 | Tx1 > Tx2 | 75.9 | 37.3 | 38.6 | Ty1 > Ty2 | 85.3 | 61.1 | 24.2 |
| Ex. 20 | T1 > T2 | 76.3 | 30.2 | 46.1 | Tx1 > Tx2 | 76.3 | 40.8 | 35.5 | Ty1 > Ty2 | 85.3 | 61.1 | 24.2 |
| Ex. 21 | T1 > T2 | 76.3 | 24.6 | 51.7 | Tx1 > Tx2 | 76.3 | 37.3 | 39.0 | Ty1 > Ty2 | 85.3 | 61.1 | 24.2 |
| Ex. 22 | T1 > T2 | 76.3 | 21.9 | 54.4 | Tx1 > Tx2 | 76.3 | 36.3 | 40.0 | Ty1 > Ty2 | 85.3 | 61.1 | 24.2 |
| Ex. 23 | T1 > T2 | 75.9 | 26.1 | 49.8 | Tx1 > Tx2 | 75.9 | 36.9 | 39.0 | Ty1 > Ty2 | 85.3 | 61.1 | 24.2 |
| Ex. 24 | T1 > T2 | 75.9 | 24.6 | 51.3 | Tx1 > Tx2 | 75.9 | 36.8 | 39.1 | Ty1 > Ty2 | 85.3 | 61.1 | 24.2 |
| Ex. 25 | T1 > T2 | 76.1 | 24.0 | 52.1 | Tx1 > Tx2 | 76.1 | 36.7 | 39.4 | Ty1 > Ty2 | 85.3 | 61.1 | 24.2 |
| Ex. 26 | T1 > T2 | 76.1 | 48.1 | 28.0 | Tx1 > Tx2 | 76.1 | 48.1 | 28.0 | Ty1 = Ty2 | 85.3 | 85.3 | 0.0 |
| Ex. 27 | T1 > T2 | 49.1 | 34.0 | 15.1 | Tx1 > Tx2 | 76.1 | 48.1 | 28.0 | Ty1 = Ty2 | 61.1 | 61.1 | 0.0 |
| Ex. 28 | T1 > T2 | 49.1 | 24.0 | 25.1 | Tx1 > Tx2 | 76.1 | 36.7 | 39.4 | Ty1 = Ty2 | 61.1 | 61.1 | 0.0 |
| Ex. 29 | T1 > T2 | 76.1 | 24.0 | 52.1 | Tx1 > Tx2 | 76.1 | 36.7 | 39.4 | Ty1 > Ty2 | 85.3 | 61.1 | 24.2 |
| Ex. 30 | T1 > T2 | 49.1 | 34.0 | 15.1 | Tx1 > Tx2 | 76.1 | 48.1 | 28.0 | Ty1 = Ty2 | 61.1 | 61.1 | 0.0 |
| Ex. 31 | T1 > T2 | 76.3 | 29.0 | 47.3 | Tx1 > Tx2 | 76.3 | 40.3 | 36.0 | Ty1 > Ty2 | 85.3 | 61.1 | 24.2 |
| Ex. 32 | T1 > T2 | 76.3 | 29.0 | 47.3 | Tx1 > Tx2 | 76.3 | 40.3 | 36.0 | Ty1 > Ty2 | 85.3 | 61.1 | 24.2 |
| Ex. 33 | T1 > T2 | 76.3 | 29.0 | 47.3 | Tx1 > Tx2 | 76.3 | 40.3 | 36.0 | Ty1 > Ty2 | 85.3 | 61.1 | 24.2 |
| Ex. 34 | T1 > T2 | 76.3 | 29.0 | 47.3 | Tx1 > Tx2 | 76.3 | 40.3 | 36.0 | Ty1 > Ty2 | 85.3 | 61.1 | 24.2 |
| Ex. 35 | T1 > T2 | 76.3 | 29.0 | 47.3 | Tx1 > Tx2 | 76.3 | 40.3 | 36.0 | Ty1 > Ty2 | 85.3 | 61.1 | 24.2 |
| Ex. 36 | T1 > T2 | 76.3 | 29.0 | 47.3 | Tx1 > Tx2 | 76.3 | 40.3 | 36.0 | Ty1 > Ty2 | 85.3 | 61.1 | 24.2 |
| Ex. 37 | T1 > T2 | 76.3 | 27.6 | 48.7 | Tx1 > Tx2 | 76.3 | 42.0 | 34.3 | Ty1 > Ty2 | 85.3 | 61.1 | 24.2 |
| Ex. 38 | T1 > T2 | 76.3 | 27.7 | 48.6 | Tx1 > Tx2 | 76.3 | 42.2 | 34.1 | Ty1 > Ty2 | 85.3 | 61.1 | 24.2 |
| Ex. 39 | T1 > T2 | 76.3 | 27.7 | 48.6 | Tx1 > Tx2 | 76.3 | 42.1 | 34.2 | Ty1 > Ty2 | 85.3 | 61.1 | 24.2 |
| Ex. 40 | T1 > T2 | 76.3 | 27.9 | 48.4 | Tx1 > Tx2 | 76.3 | 42.1 | 34.2 | Ty1 > Ty2 | 85.3 | 61.1 | 24.2 |
| Ex. 41 | T1 > T2 | 76.3 | 28.8 | 47.5 | Tx1 > Tx2 | 76.3 | 43.9 | 32.4 | Ty1 > Ty2 | 85.3 | 61.1 | 24.2 |
| Ex. 42 | T1 > T2 | 76.3 | 29.2 | 47.1 | Tx1 > Tx2 | 76.3 | 44.0 | 32.3 | Ty1 > Ty2 | 85.3 | 61.1 | 24.2 |
| Ex. 43 | T1 > T2 | 76.3 | 29.9 | 46.4 | Tx1 > Tx2 | 76.3 | 45.5 | 30.8 | Ty1 > Ty2 | 85.3 | 61.1 | 24.2 |
| Ex. 44 | T1 > T2 | 76.3 | 29.7 | 46.6 | Tx1 > Tx2 | 76.3 | 44.7 | 31.6 | Ty1 > Ty2 | 85.3 | 61.1 | 24.2 |
| Comp. Ex. 1 | T1 > T2 | 76.1 | 49.1 | 27.0 | Tx1 = Tx2 | 76.1 | 76.1 | 0.0 | Ty1 > Ty2 | 85.3 | 61.1 | 24.2 |
| Comp. Ex. 2 | T1 = T2 | 76.1 | 76.1 | 0.0 | Tx1 = Tx2 | 76.1 | 76.1 | 0.0 | Ty1 = Ty2 | 85.3 | 85.3 | 0.0 |
| Comp. Ex. 3 | T1 = T2 | 76.1 | 76.1 | 0.0 | Tx1 = Tx2 | 76.1 | 76.1 | 0.0 | Ty1 = Ty2 | 85.3 | 85.3 | 0.0 |
| Comp. Ex. 4 | T1 = T2 | 49.1 | 49.1 | 0.0 | Tx1 = Tx2 | 76.1 | 76.1 | 0.0 | Ty1 = Ty2 | 61.1 | 61.1 | 0.0 |

Moreover, in the following Table 6, with regard to values of T1' as reference values, the infrared ray transmittances in the wavelength of 780 to 2100 nm of laminated glass which is obtained in respective examples and respective comparative examples and allows a first laminated glass member, a first resin layer and a first laminated glass member to be layered are shown. With regard to values of T2' as reference values, the infrared ray transmittances in the wavelength of 780 to 2100 nm of laminated glass which is obtained in respective examples and respective comparative examples and allows a second laminated glass member, a second resin layer and a second laminated glass member to be layered are shown. With regard to values of Tx1' as reference values, the infrared ray transmittances in the wavelength of 780 to 2100 nm of laminated glass which is obtained in respective examples and respective comparative examples and allows a sheet of clear glass (2.5 mm in thickness), a first resin layer and a sheet of clear glass (2.5 mm in thickness) to be layered are shown. With regard to values of Tx2' as reference values, the infrared ray transmittances in the wavelength of 780 to 2100 nm of laminated glass which is obtained in respective examples and respective comparative examples and allows a sheet of clear glass (2.5 mm in thickness), a second resin layer and a sheet of clear glass (2.5 mm in thickness) are layered are shown.

TABLE 6

| | | Infrared ray transmittance | | | | | |
|---|---|---|---|---|---|---|---|
| | | Laminate (1) (reference values) | | | Laminate (2) (reference values) | | |
| | | T1' (%) | T2' (%) | T1' − T2' | Tx1' (%) | Tx2' (%) | Tx1' − Tx2' |
| Ex. 1 | T1' > T2' | 76.1 | 16.1 | 60.0 | Tx1' > Tx2' | 76.1 | 43.1 | 33.0 |
| Ex. 2 | T1' > T2' | 76.1 | 9.8 | 66.3 | Tx1' > Tx2' | 76.1 | 36.8 | 39.3 |
| Ex. 3 | T1' > T2' | 76.1 | 48.1 | 28.0 | Tx1' > Tx2' | 76.1 | 48.1 | 28.0 |
| Ex. 4 | T1' > T2' | 49.1 | 21.1 | 28.0 | Tx1' > Tx2' | 76.1 | 48.1 | 28.0 |
| Ex. 5 | T1' > T2' | 49.1 | 9.8 | 39.3 | Tx1' > Tx2' | 76.1 | 36.8 | 39.3 |
| Ex. 6 | T1' > T2' | 76.1 | 9.8 | 66.3 | Tx1' > Tx2' | 76.1 | 36.8 | 39.3 |
| Ex. 7 | T1' > T2' | 49.1 | 13.8 | 35.3 | Tx1' > Tx2' | 76.1 | 40.8 | 35.3 |
| Ex. 8 | T1' > T2' | 76.1 | 13.8 | 62.3 | Tx1' > Tx2' | 76.1 | 40.8 | 35.3 |
| Ex. 9 | T1' > T2' | 76.1 | 40.8 | 35.3 | Tx1' > Tx2' | 76.1 | 40.8 | 35.3 |
| Ex. 10 | T1' > T2' | 49.1 | 16.1 | 33.0 | Tx1' > Tx2' | 76.1 | 43.1 | 33.0 |
| Ex. 11 | T1' > T2' | 76.1 | 16.1 | 60.0 | Tx1' > Tx2' | 76.1 | 43.1 | 33.0 |
| Ex. 12 | T1' > T2' | 49.1 | 21.1 | 28.0 | Tx1' > Tx2' | 76.1 | 48.1 | 28.0 |
| Ex. 13 | T1' > T2' | 76.3 | 13.0 | 63.3 | Tx1' > Tx2' | 76.3 | 40.3 | 36.0 |
| Ex. 14 | T1' > T2' | 75.9 | 13.0 | 62.9 | Tx1' > Tx2' | 75.9 | 40.3 | 35.6 |
| Ex. 15 | T1' > T2' | 76.2 | 13.0 | 63.2 | Tx1' > Tx2' | 76.2 | 40.3 | 35.9 |
| Ex. 16 | T1' > T2' | 75.9 | 13.0 | 62.9 | Tx1' > Tx2' | 75.9 | 40.3 | 35.6 |
| Ex. 17 | T1' > T2' | 75.9 | 13.0 | 62.9 | Tx1' > Tx2' | 75.9 | 40.3 | 35.6 |
| Ex. 18 | T1' > T2' | 75.9 | 13.0 | 62.9 | Tx1' > Tx2' | 75.9 | 40.3 | 35.6 |
| Ex. 19 | T1' > T2' | 75.9 | 10.3 | 65.6 | Tx1' > Tx2' | 75.9 | 37.3 | 38.6 |
| Ex. 20 | T1' > T2' | 76.3 | 13.8 | 62.5 | Tx1' > Tx2' | 76.3 | 40.8 | 35.5 |
| Ex. 21 | T1' > T2' | 76.3 | 10.3 | 66.0 | Tx1' > Tx2' | 76.3 | 37.3 | 39.0 |
| Ex. 22 | T1' > T2' | 76.3 | 9.3 | 67.0 | Tx1' > Tx2' | 76.3 | 36.3 | 40.0 |
| Ex. 23 | T1' > T2' | 75.9 | 13.0 | 62.9 | Tx1' > Tx2' | 75.9 | 36.9 | 39.0 |
| Ex. 24 | T1' > T2' | 75.9 | 13.0 | 62.9 | Tx1' > Tx2' | 75.9 | 36.8 | 39.1 |
| Ex. 25 | T1' > T2' | 76.1 | 9.7 | 66.4 | Tx1' > Tx2' | 76.1 | 36.7 | 39.4 |
| Ex. 26 | T1' > T2' | 76.1 | 48.1 | 28.0 | Tx1' > Tx2' | 76.1 | 48.1 | 28.0 |
| Ex. 27 | T1' > T2' | 49.1 | 21.1 | 28.0 | Tx1' > Tx2' | 76.1 | 48.1 | 28.0 |
| Ex. 28 | T1' > T2' | 49.1 | 9.7 | 39.4 | Tx1' > Tx2' | 76.1 | 36.7 | 39.4 |
| Ex. 29 | T1' > T2' | 76.1 | 9.7 | 66.4 | Tx1' > Tx2' | 76.1 | 36.7 | 39.4 |
| Ex. 30 | T1' > T2' | 49.1 | 21.1 | 28.0 | Tx1' > Tx2' | 76.1 | 48.1 | 28.0 |
| Ex. 31 | T1' > T2' | 76.3 | 13.0 | 63.3 | Tx1' > Tx2' | 76.3 | 40.3 | 36.0 |
| Ex. 32 | T1' > T2' | 76.3 | 13.0 | 63.3 | Tx1' > Tx2' | 76.3 | 40.3 | 36.0 |
| Ex. 33 | T1' > T2' | 76.3 | 13.0 | 63.3 | Tx1' > Tx2' | 76.3 | 40.3 | 36.0 |
| Ex. 34 | T1' > T2' | 76.3 | 13.0 | 63.3 | Tx1' > Tx2' | 76.3 | 40.3 | 36.0 |
| Ex. 35 | T1' > T2' | 76.3 | 13.0 | 63.3 | Tx1' > Tx2' | 76.3 | 40.3 | 36.0 |
| Ex. 36 | T1' > T2' | 76.3 | 13.0 | 63.3 | Tx1' > Tx2' | 76.3 | 40.3 | 36.0 |
| Ex. 37 | T1' > T2' | 76.3 | 14.1 | 62.2 | Tx1' > Tx2' | 76.3 | 42.0 | 34.3 |
| Ex. 38 | T1' > T2' | 76.3 | 14.2 | 62.1 | Tx1' > Tx2' | 76.3 | 42.2 | 34.1 |
| Ex. 39 | T1' > T2' | 76.3 | 14.2 | 62.1 | Tx1' > Tx2' | 76.3 | 42.1 | 34.2 |
| Ex. 40 | T1' > T2' | 76.3 | 14.4 | 61.9 | Tx1' > Tx2' | 76.3 | 42.1 | 34.2 |
| Ex. 41 | T1' > T2' | 76.3 | 14.7 | 61.6 | Tx1' > Tx2' | 76.3 | 43.9 | 32.4 |
| Ex. 42 | T1' > T2' | 76.3 | 15.1 | 61.2 | Tx1' > Tx2' | 76.3 | 44.0 | 32.3 |
| Ex. 43 | T1' > T2' | 76.3 | 15.4 | 60.9 | Tx1' > Tx2' | 76.3 | 45.5 | 30.8 |
| Ex. 44 | T1' > T2' | 76.3 | 15.5 | 60.8 | Tx1' > Tx2' | 76.3 | 44.7 | 31.6 |
| Comp. Ex. 1 | T1' > T2' | 76.1 | 49.1 | 27.0 | Tx1' = Tx2' | 76.1 | 76.1 | 0.0 |
| Comp. Ex. 2 | T1' = T2' | 76.1 | 76.1 | 0.0 | Tx1' = Tx2' | 76.1 | 76.1 | 0.0 |
| Comp. Ex. 3 | T1' = T2' | 76.1 | 76.1 | 0.0 | Tx1' = Tx2' | 76.1 | 76.1 | 0.0 |
| Comp. Ex. 4 | T1' = T2' | 49.1 | 49.1 | 0.0 | Tx1' = Tx2' | 76.1 | 76.1 | 0.0 |

EXPLANATION OF SYMBOLS

1: Interlayer film
1a: First surface
1b: Second surface
2: Infrared ray reflection layer
2a: First surface
2b: Second surface
3: First resin layer
3a: Outer surface
4: Second resin layer
4a: Outer surface
11: Laminated glass
21: First laminated glass member
22: Second laminated glass member

The invention claimed is:

1. A laminated glass, comprising a first laminated glass member, a second laminated glass member and an interlayer film arranged between the first laminated glass member and the second laminated glass member; and
the first laminated glass member and the second laminated glass member each being a clear glass other than a heat ray-absorbing plate glass, or the first laminated glass member and the second laminated glass member each being a heat ray-absorbing plate glass,
the interlayer film including an infrared ray reflection layer which reflects infrared rays, a first resin layer which is arranged on a first surface side of the infrared ray reflection layer, and a second resin layer which is arranged on a second surface side opposite to the first surface of the infrared ray reflection layer and contains a thermoplastic resin,
wherein the first resin layer consists of a thermoplastic resin, a plasticizer, an ultraviolet ray shielding agent, an oxidation inhibitor, and a metal salt,
wherein the ultraviolet ray shielding agent is selected from the group consisting of a metal-based ultraviolet ray shielding agent, a metal oxide-based ultraviolet ray shielding agent, a benzotriazole-based ultraviolet ray shielding agent, a benzophenone-based ultraviolet ray shielding agent, a triazine-based ultraviolet ray shielding agent, a malonic acid ester-based ultraviolet ray shielding agent, an oxanilide-based ultraviolet ray shielding agent, and a benzoate-based ultraviolet ray shielding agent,
wherein the metal-based ultraviolet ray shielding agent is selected from the group consisting of platinum particles, platinum particles coated with silica, palladium particles, and palladium particles coated with silica,
wherein the metal oxide-based ultraviolet ray shielding agent is selected from the group consisting of zinc oxide, titanium oxide, and cerium oxide,
the first laminated glass member being arranged on the outside of the first resin layer in the interlayer film, the second laminated glass member is arranged on the outside of the second resin layer in the interlayer film,
the second resin layer containing heat shielding particles, a content of the heat shielding particles in the second resin layer being greater than or equal to 0.1% by weight in 100% by weight of the second resin layer,
the heat shielding particles in the second resin layer containing tin-doped indium oxide particles,
the infrared ray transmittance in the wavelength of 780 to 2100 nm of the whole layer composed of the first laminated glass member and the first resin layer being higher by 15% or more than the infrared ray transmittance in the wavelength of 780 to 2100 nm of the whole layer composed of the second laminated glass member and the second resin layer,
the infrared ray reflection layer being a multilayer resin film, the multilayer resin film being a laminated film in which plural resin films are layered, and
the infrared ray reflection layer extending throughout an entire region between the first resin layer and the second resin layer.

2. The laminated glass according to claim 1, wherein the infrared ray transmittance in the wavelength of 780 to 2100 nm of the whole layer composed of the first laminated glass member and the first resin layer is higher by 20% or more than the infrared ray transmittance in the wavelength of 780 to 2100 nm of the whole layer composed of the second laminated glass member and the second resin layer.

3. The laminated glass according to claim 2, wherein the infrared ray transmittance in the wavelength of 780 to 2100 nm of the whole layer composed of the first laminated glass member and the first resin layer is higher by 30% or more than the infrared ray transmittance in the wavelength of 780 to 2100 nm of the whole layer composed of the second laminated glass member and the second resin layer.

4. The laminated glass according to claim 1, wherein the infrared ray transmittance in the wavelength of 780 to 2100 nm of the first resin layer is higher than the infrared ray transmittance in the wavelength of 780 to 2100 nm of the second resin layer, or
the infrared ray transmittance in the wavelength of 780 to 2100 nm of the first laminated glass member is higher than the infrared ray transmittance in the wavelength of 780 to 2100 nm of the second laminated glass member.

5. The laminated glass according to claim 4, wherein the infrared ray transmittance in the wavelength of 780 to 2100 nm of the first resin layer is higher than the infrared ray transmittance in the wavelength of 780 to 2100 nm of the second resin layer.

6. The laminated glass according to claim 4, wherein the infrared ray transmittance in the wavelength of 780 to 2100 nm of the first laminated glass member is higher than the infrared ray transmittance in the wavelength of 780 to 2100 nm of the second laminated glass member.

7. The laminated glass according to claim 1, wherein the infrared ray transmittance in the wavelength of 780 to 2100 nm of the first resin layer is higher than the infrared ray transmittance in the wavelength of 780 to 2100 nm of the second resin layer, and
the infrared ray transmittance in the wavelength of 780 to 2100 nm of the first laminated glass member is higher than the infrared ray transmittance in the wavelength of 780 to 2100 nm of the second laminated glass member.

8. The laminated glass according to claim 7, wherein the infrared ray transmittance in the wavelength of 780 to 2100 nm of the first resin layer is higher by 10% or more than the infrared ray transmittance in the wavelength of 780 to 2100 nm of the second resin layer, and
the infrared ray transmittance in the wavelength of 780 to 2100 nm of the first laminated glass member is higher by 10% or more than the infrared ray transmittance in the wavelength of 780 to 2100 nm of the second laminated glass member.

9. The laminated glass according to claim 1, wherein the second resin layer contains an adhesive force regulating agent.

10. The laminated glass according to claim 1, wherein the thermoplastic resin in the first resin layer is a polyvinyl acetal resin and the thermoplastic resin in the second resin layer is a polyvinyl acetal resin.

11. The laminated glass according to claim 1, wherein the second resin layer contains a plasticizer.

12. The laminated glass according to claim 1, wherein the second resin layer contains an ultraviolet ray shielding agent.

13. The laminated glass according to claim 1, wherein the second resin layer further comprise an oxidation inhibitor.

14. The laminated glass according to claim 13, wherein the oxidation inhibitor of the first resin layer and the second resin layer is a phenol-based oxidation inhibitor, a sulfur-based oxidation inhibitor, or a phosphorus-based oxidation inhibitor.

15. The laminated glass according to claim 1, wherein the first laminated glass member and the second laminated glass member each are a clear glass other than a heat ray-absorbing plate glass.

16. The laminated glass according to claim 1, wherein the first laminated glass member and the second laminated glass member each are a heat ray-absorbing plate glass.

17. The laminated glass according to claim 1, wherein
 the second layer comprises a metal oxide-based ultraviolet ray shielding agent comprising at least one of zinc oxide, titanium oxide, and cerium, a surface of the metal oxide-based ultraviolet ray shielding agent comprising at least one of an insulating metal oxide, a hydrolyzable organosilicon compound, and a silicone compound.

18. A method for fitting the laminated glass according to claim 1 for a building or a vehicle into an opening part between an outer space and an inner space into which heat rays are made incident from the outer space, comprising the step of fitting the laminated glass into the opening part so that the first laminated glass member is positioned at the outer space side and the second laminated glass member is positioned at the inner space side.

* * * * *